United States Patent
Kojima et al.

(10) Patent No.: US 9,903,332 B2
(45) Date of Patent: Feb. 27, 2018

(54) CONTROL DEVICE OF MULTI-CYLINDER INTERNAL COMBUSTION ENGINE

(71) Applicant: TOYOTA JIDOSHA KABUSHIKI KAISHA, Toyota-shi, Aichi-ken (JP)

(72) Inventors: Susumu Kojima, Susono (JP); Yusuke Suzuki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/070,646

(22) Filed: Mar. 15, 2016

(65) Prior Publication Data

US 2016/0273505 A1 Sep. 22, 2016

(30) Foreign Application Priority Data

Mar. 17, 2015 (JP) .................................. 2015-053701

(51) Int. Cl.
| | |
|---|---|
| F02N 11/08 | (2006.01) |
| F02D 41/26 | (2006.01) |
| F02D 41/00 | (2006.01) |
| F02N 99/00 | (2010.01) |
| F02D 41/04 | (2006.01) |
| F02D 35/02 | (2006.01) |
| F02D 41/38 | (2006.01) |

(52) U.S. Cl.
CPC ........ *F02N 11/0814* (2013.01); *F02D 41/009* (2013.01); *F02N 99/006* (2013.01);
(Continued)

(58) Field of Classification Search
CPC ............... F02N 11/0814; F02N 99/006; F02N 2200/021; F02N 2200/023; F02D 41/009;
(Continued)

(56) References Cited

U.S. PATENT DOCUMENTS 6,981,481 B2 * 1/2006 Kojima ............... F02N 11/0851
123/179.3
7,051,693 B2 * 5/2006 Tetsuno ................ F02D 41/042
123/179.5
(Continued)

FOREIGN PATENT DOCUMENTS

JP 2005-155362 A 6/2005

*Primary Examiner* — David Hamaoui
(74) *Attorney, Agent, or Firm* — Andrews Kurth Kenyon LLP

(57) ABSTRACT

The invention relates to a control device of a multi-cylinder internal combustion engine. The control device starts executing an ignition engine start control to restart the engine operation when a predetermined engine restart request is generated, a last signal output from a crank angel sensor corresponds to the compression TDC and a signal is output from the sensor before a time elapsing from the output of the last signal reaches a predetermined time. The control device starts executing a starter engine start control when the engine restart request is generated, the last signal output from the sensor corresponds to the compression TDC and no signal is output from the sensor before a time elapsing from the output of the last signal reaches the predetermined time. The control device sets the predetermined time on the basis of a last engine speed acquired on the basis of the last signal and a signal output from the sensor immediately before the last signal is output such that the predetermined time set when the last engine speed corresponds to a first engine speed, is longer than the predetermined time set when the last engine speed corresponds to a second engine speed larger than the first engine speed.

5 Claims, 16 Drawing Sheets

(52) U.S. Cl.
CPC .......... *F02D 35/024* (2013.01); *F02D 41/042* (2013.01); *F02D 2041/0095* (2013.01); *F02D 2041/389* (2013.01); *F02D 2200/021* (2013.01); *F02D 2200/023* (2013.01); *F02N 2200/021* (2013.01); *F02N 2200/023* (2013.01)

(58) Field of Classification Search
CPC ....... F02D 2041/0095; F02D 2041/389; F02D 2200/021; F02D 2200/023; F02D 35/024; F02D 41/042
See application file for complete search history.

(56) References Cited

U.S. PATENT DOCUMENTS

| | | | | |
|---|---|---|---|---|
| 7,134,414 B2* | 11/2006 | Ries-Mueller | ...... | F02N 11/0844 123/179.3 |
| 7,308,880 B2* | 12/2007 | Katayama | ............. | F02D 41/065 123/179.16 |
| 8,036,815 B2* | 10/2011 | Okumoto | ............ | F02N 11/0844 123/179.28 |
| 8,265,860 B2* | 9/2012 | Ichinose | ................. | F02D 17/04 123/179.16 |
| 8,494,758 B2* | 7/2013 | Ishikawa | ................. | F02D 17/04 123/179.4 |
| 8,510,019 B2* | 8/2013 | Okumoto | ............ | F02N 11/0844 123/179.4 |
| 8,757,120 B2* | 6/2014 | Kitano | ................ | F02N 11/0814 123/179.25 |
| 2005/0109302 A1 | 5/2005 | Tetsuno et al. | | |
| 2010/0180849 A1* | 7/2010 | Senda | ................. | F02N 11/0855 123/179.4 |
| 2016/0298559 A1* | 10/2016 | Matsushita | ......... | F02N 11/0862 |

* cited by examiner

CONTROL DEVICE OF MULTI-CYLINDER INTERNAL COMBUSTION ENGINE

CROSS-REFERENCE TO RELATED APPLICATION

The present application claims priority to Japanese Patent Application No. 2015-053701 filed on Mar. 17, 2015, which is incorporated herein by reference in its entirety.

BACKGROUND OF THE INVENTION

Field of the Invention

The present invention relates to a control device of a multi-cylinder internal combustion engine configured to start an execution of an engine stop control for stopping an operation of the engine when a predetermined engine stop condition is satisfied and after the execution of the engine stop control is started, restart the operation of the engine when a predetermined engine restart request is generated.

Description of the Related Art

In JP 2005-155362 A, there is described a multi-cylinder internal combustion engine configured to execute an engine stop control for stopping fuel injections to stop an operation of the engine when a predetermined engine stop condition is satisfied even under the condition that an ignition switch is in an ON state. Hereinafter, the operation of the engine will be referred to as "the engine operation" and the engine described in JP 2005-155362 will be referred to as "the conventional engine".

In the conventional engine, when a request of restarting the engine operation (i.e., an engine restart request) is generated after the engine stop control is started to be executed, executed is an ignition engine start control for restarting the engine operation by carrying out fuel injection and fuel ignition without using a starter motor at a combustion chamber where a respective piston stops in the combustion stroke.

SUMMARY OF THE INVENTION

The piston of any of cylinders may stop at the compression TDC when the engine operation stops. A crank shaft of the engine is unlikely to be rotated even if the ignition engine start control is started to be executed in the cylinder where the respective piston stops at the compression TDC when the engine restart request is generated. In this case, it is necessary to execute a starter engine start control for carrying out fuel injections and fuel ignitions while rotating a crank shaft of the engine by the starter motor in order to assuredly restart the engine operation.

In general, it is determined whether or not the engine operation stops on the basis of whether or not no pulse signal has been output from a crank angle sensor for a constant time. In particular, when no pulse signal has been output from the crank angle sensor for a constant time, it is determined that the engine operation stops. Therefore, when no pulse signal has been output from the crank angle sensor for a constant time after a pulse signal corresponding to the compression TDC is output from the crank angle sensor in any of the cylinders, it is determined that the engine operation stops and the respective piston stops at the compression TDC. Hereinafter, this determination will be referred to as "the TDC stop determination". In addition, the stop of the piston at the compression TDC will be referred to as "the TDC stop".

Even when it is determined that the TDC stop occurs, the piston may not stop at the compression TDC. In other words, the piston may stop immediately before the compression TDC or the piston may move extremely slowly toward the compression TDC immediately before the compression TDC or the piston may move extremely slowly immediately after the compression TDC.

Under the condition that the piston stops immediately before the compression TDC, the crank shaft of the engine is likely to rotate in the inverse direction eventually. Therefore, if the crank shaft rotates in the inverse direction, the engine operation can be restarted by the execution of the ignition engine start control, not by the execution of the starter engine start control. On the other hand, under the condition that the piston moves extremely slowly toward the compression TDC immediately before the compression TDC or immediately after the compression TDC, the rotation of the crank shaft does not stop and thus, the engine operation can be restarted by the execution of the ignition engine start control, not by the execution of the starter engine start control.

Therefore, if the engine operation is restarted by the execution of the starter engine start control at the time when it is determined that the TDC stop determination is made, it is not possible to ensure an opportunity of restarting the engine operation by the execution of the ignition engine start control.

In general, a large amount of electric power is consumed to drive the starter motor. Thus, in order to reduce the amount of the consumed electric power, it is preferred to restart the engine operation by the execution of the ignition engine control when the engine operation can be restarted by the execution of the ignition engine start control. This is achieved by increasing the above-described constant time to accurately determine that the rotation of the crank shaft stops. In this case, as the constant time increases, the opportunity of restarting the engine operation by the execution of the ignition engine start control increases. However, when the engine operation should be restarted by the execution of the starter engine start control, the timing of restarting the engine operation by the execution of the starter engine start control delays.

The present invention is made for addressing such a problem. In particular, one of objects of the present invention is to provide a control device of a multi-cylinder internal combustion engine which can increase the opportunity of restarting the engine operation by the execution of the ignition engine start control without excessively delaying the timing of restarting the engine operation by the execution of the starter engine start control.

The control device according to the present invention (hereinafter, will be referred to as "the present invention device") is applied to a multi-cylinder internal combustion engine (10) comprising:

cylinder bores (21);

pistons (22) housed in the respective cylinder bores (21), the respective pistons (22) and the respective cylinder bores (21) forming combustion chambers (25);

fuel injectors (39) for injecting fuel directly into the respective combustion chambers (25);

ignition devices (35) each including a spark plug (37);

a crank angle sensor (74) for outputting a signal every predetermined crank angle;

a crank shaft (24) connected to the pistons (22); and a starter motor (26) for rotating the crank shaft (24).

The present invention device comprises a control section (80) programmed to control operations of the fuel injectors (39), the ignition devices (25) and the starter motor (26) and acquire a speed of the engine (10) as an engine speed on the basis of the signal output from the crank angle sensor (74).

The control section (80) is programmed to start executing an engine stop control for causing the fuel injectors (39) to stop injecting fuel to stop an operation of the engine (10) when a predetermined engine stop condition is satisfied.

Further, the control section (80) is programmed to start executing an ignition engine start control for causing the fuel injector (39) to inject fuel into the combustion chamber (25), a stroke of which corresponding to the combustion stroke, and causing the ignition device (35) to ignite the fuel to restart the operation of the engine (10) when a predetermined engine restart request is generated after the execution of the engine stop control is started, a last signal, which is lastly output from the crank angle sensor (74) before the predetermined engine restart request is generated, corresponds to a signal corresponding to the compression TDC of any of the combustion chambers (25) and a signal is output from the crank angle sensor (74) before a time elapsing from the output of the last signal from the crank angle sensor (74) reaches a predetermined time.

On the other hand, the control section (80) is programmed to start executing a starter engine start control for causing the fuel injectors (39) to inject fuel and causing the ignition devices (35) to ignite the fuel while causing the starter motor (26) to rotate the crank shaft (24) to restart the operation of the engine (10) when the engine restart request is generated after the execution of the engine stop control is started, the last signal corresponds to a signal corresponding to the compression TDC of any of the combustion chambers (25) and no signal is output from the crank angle sensor (74) before a time elapsing from the output of the last signal from the crank angle sensor (74) reaches the predetermined time.

The control section (80) is programmed to set the predetermined time on the basis of a last engine speed acquired on the basis of the last signal and a signal output from the crank angle sensor (74) immediately before the last signal is output from the crank angle sensor (74) such that the predetermined time set when the last engine speed corresponds to a first engine speed, is longer than the predetermined time set when the last engine speed corresponds to a second engine speed larger than the first engine speed.

When the predetermined time set when the last engine speed is small, is longer than the predetermined time set when the last engine speed is large, the opportunity of restarting the engine operation by executing the ignition engine start control is increased without excessively delaying the timing of restarting the engine operation by executing the starter engine start control. The reasons for obtaining such a technical effect will be described.

As described above, even when occurs a TDC stop determination state capable of determining, on the basis of signals output from the crank angle sensor, that the rotation of the crank angle (i.e., the operation of the engine) stops under the condition that the crank angle of any of the combustion chambers corresponds to the compression TDC, the crank shaft eventually may rotate in the inverse direction or the rotation of the crank shaft may not stop. In this connection, the inventors of this application have realized that the time period from the occurrence of the TDC stop determination state (i.e., the TDC stop determination time) to the time of the output of the signal from the crank angle sensor (i.e., the signal output time) decreases as the last engine speed increases. The reasons that such a phenomena occurs can be estimated as described below.

When the last engine speed is large, an inertia of the rotation of the crank shaft is large. Therefore, immediately before the rotation of the crank shaft stops, the piston moving toward the compression TDC can approach the compression TDC.

In this regard, under the condition that the piston stops immediately before the compression TDC upon the generation of the TDC stop determination state, a pressure in the cylinder (i.e., an in-cylinder pressure) increases as the piston approaches the compression TDC. As a result, after the piston stops, the piston starts moving in the inverse direction (i.e., the direction that the piston moves away from the compression TDC) within a relatively short time. Thus, when the last engine speed is large, the time from the TDC stop determination time to the signal output time is short.

On the other hand, when the inertia of the rotation of the crank shaft is large under the condition that the piston moves extremely slowly toward the compression TDC immediately before the compression TDC upon the occurrence of the TDC stop determination state, the piston is likely to move beyond the compression TDC. As a result, the piston moves beyond the compression TDC within a relatively short time. Thus, when the last engine speed is large, the time from the TDC stop determination time to the signal output time is short.

Further, when the inertia of the rotation of the crank shaft is large under the condition that the piston moves extremely slowly immediately after the compression TDC upon the occurrence of the tdc step determination state, the piston eventually moves fast. Thus, when the last engine speed is large, the time from the TDC stop determination time to the signal output time is short.

As described above, when the last engine speed is large, the time from the TDC stop determination time to the signal output time is short. In other words, when the last engine speed is small, the time from the TDC stop determination time to the signal output time is long. Therefore, when the last engine speed is small, the possibility of confirming that the crank shaft rotates by increasing the predetermined time and thus, the opportunity of restarting the engine operation by executing the ignition engine start control can be increased.

On the other hand, even when the predetermined time is decreased under the condition that the last engine speed is large, the possibility of confirming that the crank shaft rotates until the predetermined time elapses is high and thus, the opportunity of restarting the engine operation by executing the ignition engine start control can be ensured. Even if it is not confirmed that the crank shaft rotates, the predetermined time is short and thus, the excessive delay of the timing of restarting the engine operation by executing the starter engine start can be prevented.

For the above-described reasons, when the predetermined time set when the last engine speed is small, is longer than the predetermined time set when the last engine speed is large, the opportunity of restarting the engine operation by executing the ignition engine start control can be increased without excessively delaying the timing of restarting the engine operation by executing the starter engine start control.

The control section (80) of the present invention device may be programmed:

to acquire an in-cylinder pressure correlation value when the last signal corresponds to the combustion TDC of a particular combustion chamber (25) among the combustion chambers (25), the in-cylinder pressure correlation value correlating with an in-cylinder pressure of the particular combustion chamber (25) and a first in-cylinder pressure correlation value corresponding to the in-cylinder pressure correlation value acquired when the in-cylinder pressure corresponds to a first in-cylinder pressure, is smaller than a second in-cylinder pressure correlation value corresponding to the in-cylinder pressure correlation value acquired when the in-cylinder pressure corresponds to a second in-cylinder pressure higher than the first in-cylinder pressure; and to correct the predetermined time on the basis of the in-cylinder pressure correlation value such that the predetermined time set when the in-cylinder pressure correlation value corresponds to the first in-cylinder pressure correlation value, is smaller than the predetermined time set when the in-cylinder pressure correlation value corresponds to the second in-cylinder pressure correlation value.

In this case, for example, the in-cylinder pressure correlation value changes depending on at least one of a pressure and a temperature of air suctioned into the combustion chambers (25).

Further, the in-cylinder pressure correlation value set when the pressure of the air corresponds to a first pressure, is smaller than the in-cylinder pressure correlation value set when the pressure of the air corresponds to a second pressure higher than the first pressure.

Furthermore, the in-cylinder pressure correlation value set when the temperature of the air corresponds to a first air temperature, is smaller than the in-cylinder pressure correlation value set when the temperature of the air corresponds to a second air temperature higher than the first air temperature.

Accordingly, the opportunity of restarting the engine operation by executing the ignition engine start control can be increased without excessively delaying the timing of restarting the engine operation by executing the starter engine start control. Reasons for obtaining such a technical effect are as follows. Under the condition that the in-cylinder pressure correlation value is large, the in-cylinder pressure is high when the piston locates at or amount the compression TDC.

Therefore, when the in-cylinder pressure is high under the condition that the piston of a TDC stop cylinder stops immediately before the compression TDC, the piston eventually starts moving in the inverse direction within a relatively short time. Thus, the signal is likely to be output from the crank angle sensor within a relatively short time. In this connection, the TDC stop cylinder corresponds to a cylinder where the respective piston stops at the compression TDC upon the occurrence of the TDC stop determination state.

Further, when the in-cylinder pressure is high under the condition that the piston of the TDC stop cylinder moves extremely slowly toward the compression TDC immediately before the compression TDC upon the occurrence of the TDC stop determination state and then, the piston stops before the compression TDC, the piston is likely to eventually start moving in the inverse direction within a relatively short time. Thus, after the occurrence of the TDC stop determination state, a signal is likely to be output from the crank angle sensor. On the other hand, if the piston moves beyond the compression TDC, the piston eventually moves fast, that is, the crank shaft rotates in the normal direction with a large speed. Thus, after the occurrence of the TDC stop determination state, a signal is likely to be output from the crank angle sensor within a relatively short time.

Furthermore, when the in-cylinder pressure is high under the condition that the piston of the TDC stop cylinder moves extremely slowly immediately after the compression TDC upon the occurrence of the TDC stop determination state, the piston eventually moves fast. Thus, after the occurrence of the TDC stop determination state, a signal is likely to be output from the crank angle sensor within a relatively short time.

As described above, when the in-cylinder pressure is high, a signal is likely to be output from the crank angle sensor within a relatively short time after the occurrence of the TDC stop determination state. Therefore, even when the predetermined time is increased under the condition that the in-cylinder pressure is high, a signal is output from the crank angle sensor within a relatively short time after the occurrence of the TDC stop determination state and thus, the engine operation is restarted by the execution of the ignition engine start control. Thus, an opportunity of restarting the engine operation by executing the ignition engine start control can be increased without excessively delaying the timing of restarting the engine operation by executing the starter engine start control.

On the other hand, under the condition that the in-cylinder pressure is low, the in-cylinder pressure is low when the piston locates at or around the compression TDC. Therefore, when the in-cylinder pressure is low under the condition that the piston of the TDC stop cylinder stops immediately before the compression TDC, the piston is unlikely to start moving in the inverse direction. Thus, after the occurrence of the TDC stop determination state, a signal is unlikely to be output from the crank angle sensor.

Further, when the in-cylinder pressure is low under the condition that the piston of the TDC stop cylinder moves extremely slowly toward the compression TDC immediately before the compression TDC upon the occurrence of the TDC stop determination state, the piston is likely to stop immediately before the compression TDC without moving beyond the compression TDC. Thus, after the occurrence of the TDC stop determination state, a signal is unlikely to be output from the crank angle sensor.

Furthermore, when the in-cylinder pressure is low under the condition that the piston of the TDC stop cylinder moves extremely slowly immediately after the compression TDC upon the occurrence of the TDC stop determination state, the piston is likely to stop. Thus, after the occurrence of the TDC stop determination state, a signal is unlikely to be output from the crank angle sensor.

As described above, when the in-cylinder pressure is low, a signal is unlikely to be output from the crank angle sensor after the occurrence of the TDC stop determination state. Therefore, even when the predetermined time is decreased under the condition that the in-cylinder pressure is low, a signal is unlikely to be output from the crank angle sensor after the predetermined time elapses. Thus, even when the engine operation is restarted by the execution of the starter engine start control under the condition that a signal is not output from the crank angle sensor before the predetermined time elapses, an opportunity of restarting the engine operation by executing the ignition engine start control can be ensured. In addition, the restart of the engine operation by the execution of the starter engine start control can be started at an early timing.

For the reasons described above, an opportunity of restarting the engine operation by executing the ignition engine start control can be increased by increasing the predetermined time when the in-cylinder pressure correlation value is large and decreasing the predetermined time when the in-cylinder pressure correlation value is small without excessively delaying the timing of restarting the engine operation by executing the starter engine start control.

Further, the control section (80) of the present invention device may be programmed:

to acquire a viscosity correlation value correlating with a viscosity of lubrication oil for lubricating the engine (10) when the last signal corresponds to a signal corresponding to the combustion TDC of a particular combustion chamber (25) among the combustion chambers (25), a first viscosity correlation value corresponding to the viscosity correlation value acquired when the viscosity corresponds to a first viscosity, is smaller than a second viscosity correlation value corresponding to the viscosity correlation value acquired when the viscosity corresponds to a second viscosity higher than the first viscosity; and to correct the predetermined time on the basis of the viscosity correlation value such that the predetermined time set when the viscosity correlation value corresponds to the first viscosity correlation value, is longer than the predetermined time set when the viscosity correlation value corresponds to the second viscosity correlation value.

In this case, for example, the viscosity correlation value changes depending on a temperature of a cooling water for cooling the engine (10) and the viscosity correlation value acquired when the temperature of the cooling water corresponds to a first cooling water temperature, is larger than the viscosity correlation value acquired when the temperature of the cooling water corresponds to a second cooling water temperature higher than the first cooling water temperature.

Thereby, an opportunity of restarting the engine operation by executing the ignition engine start control can be increased without excessively delaying the timing of restarting the engine operation by executing the starter engine start control. Reasons for obtaining such a technical effect are as follows. When the viscosity correlation value is small, the viscosity of the lubrication oil for lubricating the engine is low.

Therefore, when the viscosity of the lubrication oil is low under the condition that the piston of the TDC stop cylinder stops immediately before the compression TDC upon the occurrence of the TDC stop determination state, the piston is likely to move. Therefore, the piston is likely to start moving in the invert direction within a relatively short time after the occurrence of the TDC stop determination state. Thus, a signal is likely to be output from the crank angle sensor within a relatively short time after the occurrence of the TDC stop determination state.

Further, when the viscosity of the lubrication oil is low under the condition that the piston of the TDC stop cylinder moves extremely slowly toward the compression TDC immediately before the compression TDC upon the occurrence of the TDC stop determination state, the piston is likely to move beyond the compression TDC. In addition, once the piston moves beyond the compression TDC, the piston moves fast. Thus, a signal is likely to be output from the crank angle sensor within a relatively short time after the occurrence of the TDC stop determination state. Even if the piston stops without moving beyond the compression TDC, the viscosity of the lubrication oil is low and thus, the piston is likely to move. Therefore, the piston is likely to start moving in the invert direction within a relatively short time after the piston stops. Thus, a signal is likely to be output from the crank angle sensor within a relatively short time after the occurrence of the TDC stop determination state.

Furthermore, when the viscosity of the lubrication oil is low under the condition that the piston of the TDC stop cylinder moves extremely slowly immediately after the compression TDC upon the occurrence of the TDC stop determination state, the piston eventually starts moving fast. Thus, a signal is likely to be output from the crank angle sensor within a relatively short time after the occurrence of the TDC stop determination state.

As described above, when the viscosity of the lubrication oil is low, a signal is likely to be output from the crank angle sensor within a relative short time after the occurrence of the TDC stop determination state. Therefore, even when the predetermined time is increased under the condition that the viscosity correlation value is small, a signal is output from the crank angle sensor within a relatively short time after the occurrence of the TDC stop determination state and thus, the engine operation is restarted by the execution of the ignition engine start control. Thus, an opportunity of restarting the engine operation by executing the ignition engine start control can be increased without excessively delaying the timing of restarting the engine operation by executing the starter engine start control.

On the other hand, when the viscosity correlation value is large, the viscosity of the lubrication oil is high. Therefore, when the viscosity of the lubrication oil is high under the condition that the piston of the TDC stop cylinder stops immediately before the compression TDC upon the occurrence of the TDC stop determination state, the piston is unlikely to move. Therefore, the piston is unlikely to move in the inverse direction after the occurrence of the TDC stop determination state. Thus a signal is unlikely to be output from the crank angle sensor after the occurrence of the td stop determination state.

Further, when the viscosity of the lubrication oil is high under the condition that the piston of the TDC stop cylinder moves extremely slowly toward the compression TDC immediately before the compression TDC upon the occurrence of the TDC stop determination state, the piston is likely to stop immediately before the compression TDC without moving beyond the compression TDC. Thus, a signal is unlikely to be output from the crank angle sensor after the occurrence of the TDC stop determination state.

Furthermore, when the viscosity of the lubrication oil is high under the condition that the piston of the TDC stop cylinder moves extremely slowly immediately after the compression TDC upon the occurrence of the TDC stop determination state, the piston is likely to stop immediately after the compression TDC. Thus, a signal is unlikely to be output from the crank angle sensor after the occurrence of the TDC stop determination state.

As described above, when the viscosity of the lubrication oil is high, a signal is unlikely to be output from the crank angle sensor after the occurrence of the TDC stop determination state. Therefore, even when the predetermined time is decreased under the condition that the viscosity correlation value is large, a signal is unlikely to be output from the crank angle sensor after the predetermined time elapses. Thus, even when the engine operation is restarted by the execution of the starter engine start control under the condition that a signal is not output from the crank angle sensor before the predetermined time elapses, an opportunity of restarting the engine operation by executing the ignition engine start control can be ensured. In addition, the restart of the engine operation by the execution of the starter engine start control can be started at an early timing.

For the reasons described above, an opportunity of restarting the engine operation by executing the ignition engine start control can be increased without excessively delaying the timing of restarting the engine operation by executing the starter engine start control by increasing the predetermined time when the viscosity correlation value is small and decreasing the predetermined time when the viscosity correlation value is large.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a control device of a multi-cylinder internal combustion engine according to an embodiment of the present invention will be described with reference to the drawings. Hereinafter, the control device according to the embodiment will be referred to as "the present control device".

Figure 1:
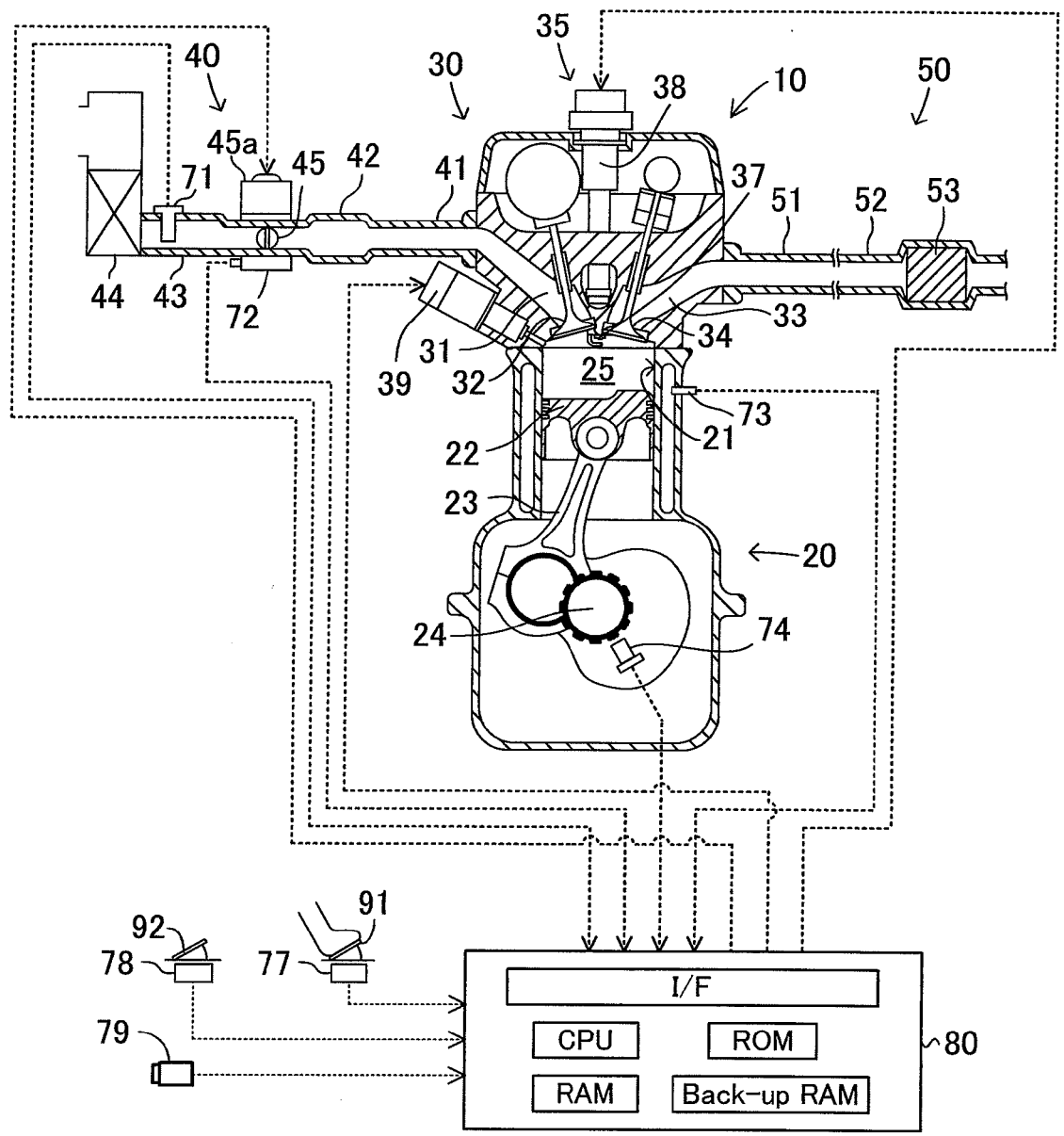
FIG. 1 shows a general view of an internal combustion engine provided with a control device according to an embodiment of the present invention.
Figure 2:
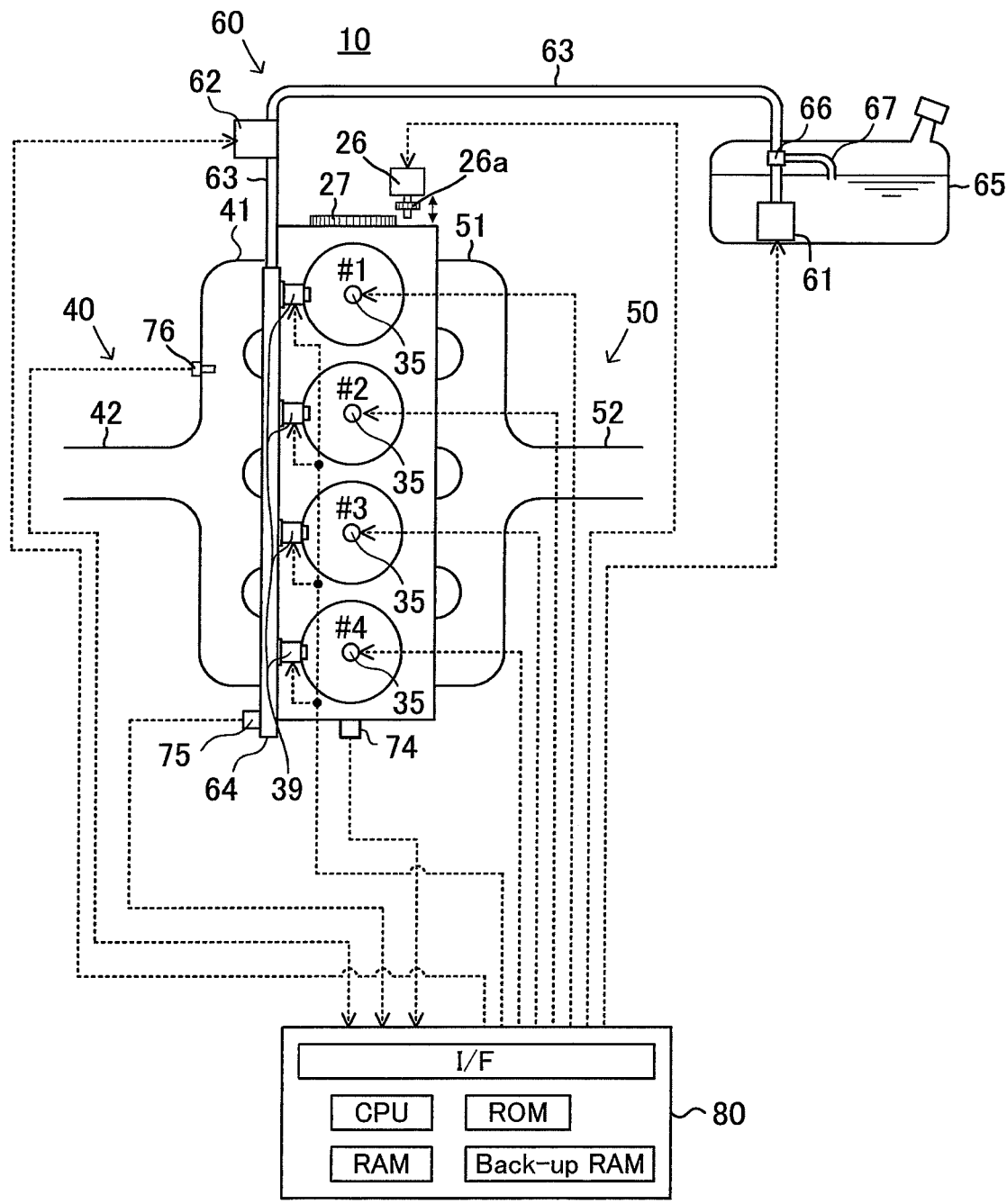
FIG. 2 shows a plan view of the engine shown in FIG. 1.

The present control device is applied to an internal combustion engine 10 shown in FIGS. 1 and 2. The engine 10 is a multi-cylinder (in this example, linear-four-cylinder) four-cycle piston-reciprocating in-cylinder-injection (i.e., direct-injection) spark-ignition gasoline internal combustion engine.

The engine 10 includes a cylinder block part 20, a cylinder head part 30, an intake system 40 and an exhaust system 50. The cylinder block part 20 includes a cylinder block, a cylinder block lower case, an oil pan and the like. The cylinder head part 30 is mounted on the cylinder block part 20. The intake system 40 serves to supply the cylinder block part 20 with air. The exhaust system 50 serves to discharge exhaust gas from the cylinder block part 20 to the outside. Further, as shown in FIG. 2, the engine 10 includes a fuel supply system 60 for supplying the cylinder block part 20 with fuel.

As shown in FIG. 1, the cylinder block part 20 includes cylinder bores 21, pistons 22, connection rods 23 and a crank shaft 24. The respective pistons 22 move reciprocally in the respective cylinder bores 21. The reciprocal movements of the respective pistons 22 are transmitted to the crank shaft 24 via the respective connection rods 23. Thereby, the crank shaft 24 is rotated. The respective cylinder bores 21, the respective pistons 22 and the cylinder block part 20 form respective combustion chambers 25.

Further, as shown in FIG. 2, the cylinder block part 20 includes a starter motor 26. The starter motor 26 drives in response to a command sent from an engine ECU (i.e., an engine electronic control unit) 80 described later to mesh a pinion gear 26a with a ring gear 27 secured to the crank shaft 24, thereby to rotate the ring gear 27. The rotation of the ring gear 27 supplies the crank shaft 24 with a rotation torque, thereby to rotate the crank shaft 24.

The starter motor 26 of this embodiment is a type of a starter motor which starts meshing the pinion gear 26a with the ring gear 27 and rotating the pinion gear 26a generally simultaneously.

Again, referring to FIG. 1, the cylinder head part 30 includes intake ports 31, intake valves 32, exhaust ports 33, exhaust valves 34, ignition devices 35 and fuel injectors 39. The respective intake ports 31 are connected in communication with the respective combustion chambers 25. The respective intake valves 32 open and close the respective intake ports 31. The respective exhaust ports 33 are connected in communication with the respective combustion chambers 25. The respective exhaust valves 34 open and close the respective exhaust ports 33. The respective ignition devices 35 ignite fuel in the respective combustion chambers 25. The respective fuel injectors 39 inject fuel directly into the respective combustion chambers 25.

Each of the ignition devices 35 includes a spark plug 37 and an igniter 38 including an ignition coil for generating a high voltage to be supplied to the respective spark plug 37. The igniter 38 is configured to generate a high voltage by using the ignition coil in response to a command sent from the ECU 80 described later. This high voltage is supplied to the spark plug 37 and thereby, the spark plug 37 produces a spark.

The fuel injectors 39 are provided in the cylinder head part 30 such that fuel injection holes of the respective fuel injectors 39 expose to the respective combustion chambers 25. The respective fuel injectors 39 are configured to open in response to commands sent from the ECU 80 described later to inject fuel directly into the respective combustion chambers 25.

The intake system 40 includes an intake manifold 41, a surge tank 42 and an intake pipe 43. The intake manifold 41 is connected in communication with the intake ports 31. The surge tank 42 is connected in communication with the intake manifold 41. The intake pipe 43 is connected in communication with the surge tank 42 at one end of the intake pipe 43. The intake ports 31, the intake manifold 41, the surge tank 42 and the intake pipe 43 form an intake passage.

Further, the intake system 40 includes an air filter 44, a throttle valve 45 and a throttle valve actuator 45a in order from the other end of the intake pipe 43 toward a downstream side (i.e., toward the surge tank 42). The air filter 44 and the throttle valve 45 are provided in the intake pipe 43.

The throttle valve 45 is rotatably supported on the intake pipe 43. The throttle valve 45 is driven by the throttle valve actuator 45a to adjust an opening degree of the throttle valve 45. The throttle valve actuator 45a is comprised of a DC motor. The throttle valve actuator 45a drives the throttle valve 45 in response to a command sent from the ECU 80 described later.

The exhaust system 50 includes an exhaust manifold 51 and an exhaust pipe 52. The exhaust manifold 51 is connected in communication with the exhaust ports 33. The exhaust pipe 52 is connected in communication with the exhaust manifold 51. The exhaust ports 33, the exhaust manifold 51 and the exhaust pipe 52 form an exhaust passage.

Further, the exhaust system 50 includes a three-way catalyst 53. The catalyst 53 is provided in the exhaust pipe 52. The catalyst 53 is a so-called three-way catalyst device or a so-called exhaust gas purification catalyst which carries active components comprised of noble metal such as platinum. The catalyst 53 has an oxidation function for oxidizing unburned components such as HC, CO and $H_2$ and a reduction function for reducing NOx (nitrogen oxide) when an air-fuel ratio of gas flowing into the catalyst 53 corresponds to the stoichiometric air-fuel ratio.

Further, the catalyst 53 has an oxygen absorption function for absorbing or storing oxygen therein. With this oxygen absorption function, the catalyst 53 can purify the unburned components and NOx even when the air-fuel ratio of the gas flowing into the catalyst 53 changes from the stoichiometric air-fuel ratio. This oxygen absorption function is derived from ceria ($CeO_2$) which is carried on the catalyst 53.

As shown in FIG. 2, the fuel supply system 60 includes a low pressure fuel pump 61, a high pressure fuel pump 62, a fuel discharge pipe 63, a delivery pipe 64 or a pressure accumulation chamber 64 and a fuel tank 65. The fuel discharge pipe 63 connects the low pressure fuel pump 61 to the delivery pipe 64 in communication manner. The delivery pipe 64 is connected in communication with the fuel injectors 39.

The low pressure fuel pump 61 is provided in the fuel tank 65. The low pressure fuel pump 61 is driven by an electric motor, which activates in response to a command sent from the ECU 80 described later, to discharge fuel stored in the fuel tank 65 to the fuel discharge pipe 63.

The high pressure fuel pump 62 is interposed in the fuel discharge pipe 63. The high pressure fuel pump 62 pressurizes fuel, which reaches the high pressure fuel pump 62 from the low pressure fuel pump 61 through the fuel discharge pipe 63, and supplies the pressurized fuel having a high pressure to the delivery pipe 64 through the fuel discharge pipe 63. The high pressure fuel pump 62 is activated by a drive shaft not shown, which coordinates with the crank shaft 24 of the engine 10.

The high pressure fuel pump 62 includes an electromagnetic valve not shown in a fuel suction part of the high pressure fuel pump 62. This electromagnetic valve is opened in response to a command sent from the ECU 80 described later when the high pressure fuel pump 62 starts fuel suction operation. Then, this electromagnetic valve is closed at a predetermined timing during the fuel pressurizing operation carried out by the high pressure fuel pump 62. As the timing of closing the electromagnetic valve advances, an effective stroke of a plunger not shown of the high pressure fuel pump 62 increases and thus, an amount of fuel discharged from the high pressure fuel pump 62 increases. As a result, a pressure of fuel supplied to the fuel injectors 39 increases. In particular, the high pressure fuel pump 62 can adjust a pressure of the fuel in the delivery pipe 64 (i.e., a fuel injection pressure or a delivery pipe pressure or a fuel pressure) in response to a command sent from the ECU 80.

Further, a relief valve 66 is interposed in the discharge pipe 63 in the fuel tank 65. When a pressure of the fuel in the discharge pipe 63 reaches a predetermined pressure, the relief valve 66 is opened by the pressure of the fuel. When the relief valve 66 opens, a part of the fuel discharged from the low pressure fuel pump 61 to the discharge pipe 63 is returned to the fuel tank 65 through the relief valve 66 and a relief pipe 67 connected in communication with the relief valve 66.

The ECU 80 is comprised of an electronic circuit including a known microcomputer. The ECU 80 includes a CPU, a ROM, a RAM, a backup RAM, an interface and the like. The ECU 80 is connected to various sensors described below and is configured to receive signals from these sensors. Further, the ECU 80 is configured to send command signals or drive signals to various actuators such as the throttle valve actuator 45a, the ignition devices 35 and the fuel injectors 39.

As shown in FIGS. 1 and 2, the ECU 80 is connected to an air flow meter 71, a throttle position sensor 72, a water temperature sensor 73, a crank angle sensor 74, a fuel pressure sensor 75, an intake pipe pressure sensor 76, an acceleration pedal operation amount sensor 77, a brake pedal sensor 78 and a vehicle speed sensor 79.

The air flow meter 71 is provided in the intake pipe 43. The air flow meter 71 is configured to measure a mass flow rate of air passing through the air flow meter 71 (i.e., an intake air amount) and output a signal expressing the intake air amount Ga. In addition, the air flow meter 71 is configured to detect a temperature of the air passing through the air flow meter 71 (i.e., an intake air temperature) and output a signal expressing the intake air temperature Ta.

The throttle position sensor 72 is provided on the intake pipe 43 adjacent to the throttle valve 45. The throttle position sensor 72 is configured to detect an opening degree of the throttle valve 45 (i.e., a throttle valve opening degree) and output a signal expressing the throttle valve opening degree TA.

The water temperature sensor 73 is provided in the cylinder block part 20. The water temperature sensor 73 is configured to measure a temperature of a cooling water for cooling the engine 10 (i.e., a cooling water temperature) and output a signal expressing the cooling water temperature THW.

The crank angle sensor 74 is provided in the cylinder block part 20 adjacent to the crank shaft 24. The crank angle sensor 74 is configured to output a pulse signal (i.e., a rectangular signal), cooperating with a waveform shaping circuit not shown every a predetermined angle (in this example, 10 degree crank angle). In other words, this pulse signal rapidly increases from zero (V) to a predetermined voltage at a timing when the crank shaft 24 rotates by 10 degree crank angle. Then, the pulse signal maintains the predetermined voltage. Then, the pulse signal decreases to zero (V) while the crank shaft 24 further rotates for 10 degree crank angle.

The ECU 80 is configured or programmed to acquire an engine speed NE on the basis of a time interval between timings of receiving the pulse signals. The ECU 80 determines that the engine speed NE is zero when the ECU 80 receives no pulse signal before a time TSG elapsing from the reception of the last pulse signal by the ECU 80 reaches a predetermined time TSGth. Hereinafter, this predetermined time will be referred to as "the predetermined determination time TSGth".

In addition, the engine 10 includes a cam position sensor not shown. This cam position sensor is configured to output a pulse signal only when the crank angle of a predetermined combustion chamber 25 corresponds to a base position (for example, the compression TDC). The ECU 80 is configured or programmed to detect the pulse signal output from the cam position sensor and acquire an absolute crank angle CA with respect to the base position of the predetermined combustion chamber 25 on the basis of the detected pulse signal and the pulse signal output from the crank angle sensor 74.

The fuel pressure sensor 75 is provided on the delivery pipe 64 (see FIG. 2). The fuel pressure sensor 75 is configured to measure a pressure of fuel supplied to the fuel injectors 39 (i.e., a delivery pipe pressure or a fuel pressure) and output a signal expressing this fuel pressure PF.

The present control device controls a command signal sent to the high pressure fuel pump 62 such that a difference between the fuel pressure PF acquired on the basis of the signal output from the fuel pressure sensor 75 and a target fuel pressure PFtgt becomes zero. For example, when the acquired fuel pressure PF is lower than the target fuel pressure PFtgt, the present control device controls a command signal sent to the high pressure fuel pump 62 such that an amount of fuel discharged from the high pressure fuel pump 62 increases. Thereby, a pressure of fuel supplied to the fuel injectors 39 (i.e., the fuel pressure PF) increases.

The intake pipe pressure sensor 76 is provided in the intake passage, in particular, on the intake manifold 41 at a position downstream of the throttle valve 45 (see FIG. 2). The intake pipe pressure sensor 76 is configured to measure a pressure of air in the intake manifold 41 (i.e., a pressure of air suctioned into the combustion chambers 25 or an intake pipe pressure or an intake pressure) and output a signal expressing this intake air pressure Pim.

The accelerator pedal operation amount sensor 77 is configured to detect an operation amount of the acceleration pedal 91 (i.e., an acceleration pedal operation amount) and output a signal expressing this acceleration pedal operation amount Accp (see FIG. 1). It should be noted that the ECU 80 drives the throttle valve actuator 45a such that the throttle valve opening degree TA increases as the acceleration pedal operation amount Accp increases except for a specific case described later.

The brake pedal sensor 78 is configured to detect an operation amount of the brake pedal 92 (i.e., a brake pedal operation amount) and output a signal expressing this brake pedal operation amount Brkp. It should be noted that the brake pedal sensor 78 may be a switch for outputting a high signal when the brake pedal 92 is operated (i.e., a brake operation state corresponds to an ON-state) and outputting an OFF signal when the brake pedal 92 is not operated (i.e., the brake operation state corresponds to an OFF-state).

The vehicle speed sensor 79 is configured to measure a speed of a vehicle, to which the engine 10 is installed, (i.e., a vehicle speed) and output a signal expressing this vehicle speed SPD.

<Summary of Engine Stop Control>

Next, a summary of an engine stop control executed by the present control device will be described. When a condition for causing the engine speed NE to be zero, that is, a condition for stopping an operation of the engine 10 (i.e., an engine stop condition or an engine rotation stop condition or an engine operation stop condition) is satisfied, the present control device executes an engine stop control for decreasing the engine speed NE to zero to stop the operation of the engine 10. In other words, when the engine stop condition is satisfied, the present control device executes the engine stop control for stopping injections of fuel from the fuel injectors 39 and ignitions of fuel by the ignition devices 35.

Hereinafter, the operation of the engine 10 will be referred to as "the engine operation". Further, the injection of fuel from the fuel injector 39 will be referred to as "the fuel injection" and the ignition of fuel by the ignition device 35 will be referred to as "the fuel ignition".

In this example, the engine stop condition is satisfied when following conditions (1) and (2) are both satisfied.

(1) The brake pedal 92 is depressed (i.e., operated).

(2) The vehicle speed SPD is equal to or smaller than a predetermined speed SPDth.

<Summary of Engine Start Control>

Next, a summary of an engine start control executed by the present control device will be described. When an engine restart request is generated after the present control device starts executing the engine stop control, the present control device executes any one of following controls (1) to (3) to start the engine operation (i.e., to restart the engine operation). It should be noted that in this example, the engine restart request is generated when the acceleration pedal 91 is depressed.

Figure 13:
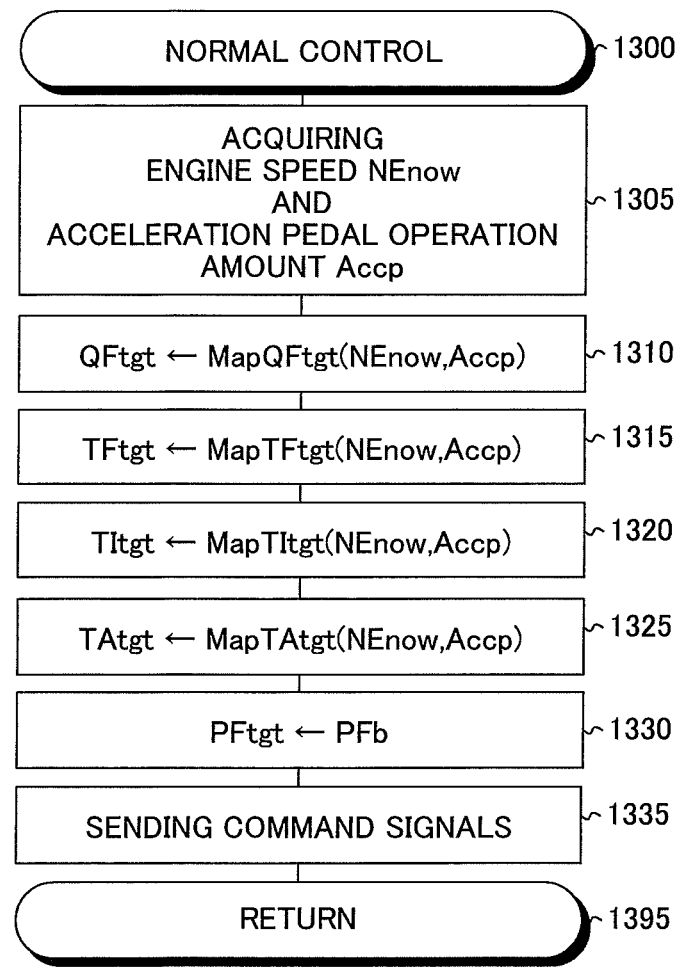
FIG. 13 shows a flowchart of a normal control routine executed by the CPU shown in FIG. 1.

(1) A normal control shown in FIG. 13 (i.e., a control for carrying out the fuel injection in the latter half of the compression stroke and the fuel ignition at around the compression TDC).

Figure 8:
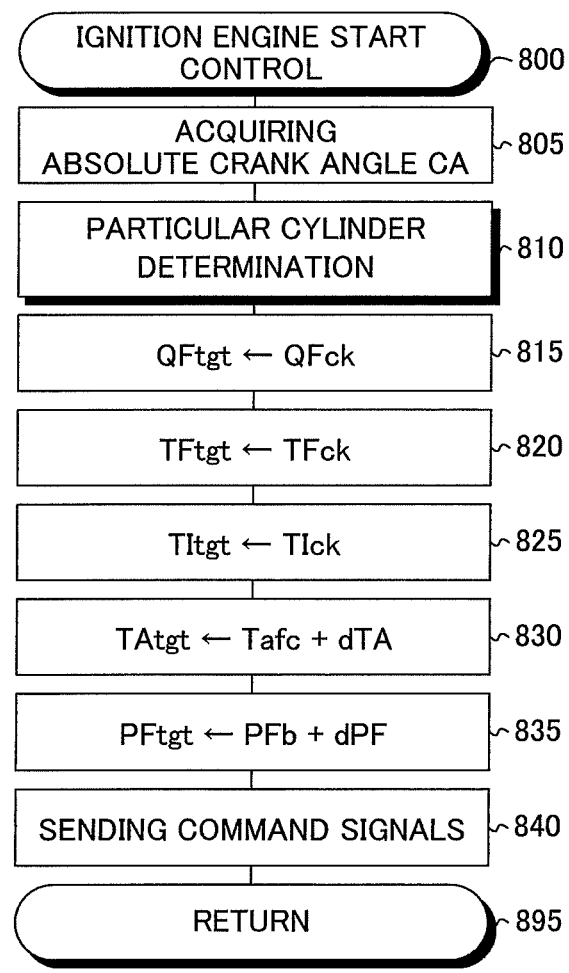
FIG. 8 shows a flowchart of an ignition engine start control routine executed by the CPU shown in FIG. 1.

(2) An ignition engine start control shown in FIG. 8 (i.e, a control for carrying out the fuel injection in the first half of the combustion stroke and the fuel ignition immediately after the fuel injection).

Figure 10:
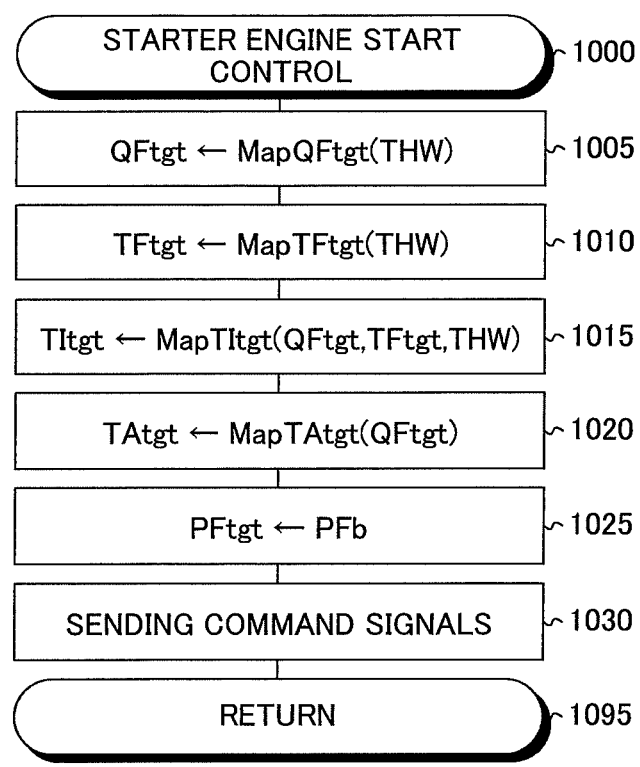
FIG. 10 shows a flowchart of a starter engine start control routine executed by the CPU shown in FIG. 1.

(3) A starter engine start control shown in FIG. 10 (i.e., a control for carrying out the fuel injection in the latter half of the compression stroke and the fuel ignition immediately after the fuel injection while activating the starter motor 26).

In particular, when the engine speed NE is equal to or larger than a predetermined engine speed NEth (NE≥NEth) upon the generation of the engine restart request, the present control device starts the engine operation by executing the normal control shown in FIG. 13. In this example, the normal control is a control for carrying out the fuel injection in the latter half of the compression stroke and the fuel ignition at around the compression TDC.

On the other hand, when the engine speed NE is smaller than the predetermined engine speed NEth and larger than zero (0<NE<NEth) upon the generation of the engine restart request, the present control device starts the engine operation by executing the ignition engine start control shown in FIG. 8. In this example, the ignition engine start control is a control for carrying out the fuel injection in the latter half of the combustion stroke and the fuel ignition immediately after the fuel injection at the combustion chamber 25, the crank angle of which being in the first half of the combustion stroke (for example, between 10 degree crank angle after the compression TDC and 30 degree crank angle after the compression TDC) upon the generation of the engine restart request or at the combustion chamber 25, the crank angle of which first becoming a crank angle of the first half of the combustion stroke after the generation of the engine restart request.

On the other hand, when it is determined that the engine speed NE is zero and the crank angles of all of the combustion chambers 25 do not correspond to the compression TDC upon the generation of the engine restart request, the present control device starts the engine operation by executing a starter engine start control shown in FIG. 10. In this example, the starter engine start control is a control for carrying out the fuel injection in the latter half of the compression stroke and the fuel ignition immediately after the fuel injection while activating the starter motor 26 to rotate the crank shaft 24 of the engine 10.

Further, when it is determined that the engine speed NE is zero and the crank angle of any of the combustion chambers 25 corresponds to the compression TDC upon the generation of the engine restart request, the present control device starts the engine operation by executing any one of the ignition engine start control and the starter engine start control as described below. It should be noted that hereinafter, the determination that the engine speed NE is zero and the crank angle of any of the combustion chambers 25 corresponds to the compression TDC will be referred to as "the TDC stop determination".

As described above, when the piston 22 of the cylinder determined as a cylinder, the crank angle of which corresponding to the compression TDC, stops immediately before the compression TDC, the air in this cylinder is pressurized significantly and thus, the pressure of the air is high. Therefore, the crank shaft 24 of the engine 10 may rotate in the inverse direction. That is, the piston 22 may move. It should be noted that hereinafter, the cylinder determined as a cylinder, the piston 22 of which stopping at the compression TDC when the TDC stop determination is made, will be referred to as "the TDC stop cylinder".

Further, as described above, when no signal is output from the crank angle sensor 74 before the elapsed time TSG from the last output of the pulse signal from the crank angle sensor 74 reaches the predetermined determination time TSGth, the present control device determines that the engine speed NE is zero. Therefore, when the crank shaft 24 rotates with the extremely small engine speed NE, the present control device may determine that the engine speed NE is zero. In particular, when the piston 22 of the TDC stop cylinder passes the compression TDC immediately before the engine operation stops, in many cases, the engine speed NE is extremely small. Therefore, even when the present control device makes the TDC stop determination, the crank shaft 24 may continue to rotate.

Thus, after the present control device makes the TDC stop determination, a signal may be output from the crank angle sensor 74. In this case, the engine operation can be started by the execution of the ignition engine start control. It should be noted that the signal output from the crank angle sensor 74 will be referred to as "the crank angle sensor signal".

As described above, generally, a large amount of electric power is consumed for driving the starter motor 26. Thus, in order to reduce an amount of the consumed electric power, it is preferred that the engine operation is started by the execution of the ignition engine start control when the engine operation can be started by the execution of the ignition engine start control.

Therefore, when the present control device has determined that the TDC stop occurs upon the generation of the engine restart request, it is preferred that the engine operation is started as follows without promptly starting the engine operation by executing the starter engine start control.

In particular, under the condition that the present control device has made the TDC stop determination upon the generation of the engine restart request, when the crank angle sensor signal is not output before a constant time elapses from the generation of the engine restart request (i.e., the rotation of the crank shaft 24 is stopped when the constant time elapses from the generation of the engine restart request), the present control device causes the engine operation to start by executing the starter engine start control upon the elapse of the constant time. On the other hand, when the crank angle sensor signal is output before the constant time elapses from the generation of the engine restart request, the present control device causes the engine operation to start by executing the ignition engine start control upon the output of the crank angel sensor signal. The start of the engine operation described above can increase an opportunity of restarting the engine operation by executing the ignition engine start control.

Further, in this case, as the aforementioned constant time increases, the opportunity of starting the engine operation by executing the ignition engine start control increases. Thus, it is preferred that the constant time is set to a long time in terms of the reduction of the consumed electric power. On the contrary, when the crank angle sensor signal is not output before the constant time elapses and as a result, the engine operation is started by the execution of the starter engine start control, there is raised a problem that a time taken from the generation of the engine restart request to the start of the engine operation is long.

In this regard, the inventors of this application has realized that a time taken from the TDC stop determination to the output of the crank angle sensor signal correlates with the engine speed NE immediately before the TDC stop determination. In particular, the inventors of this application has realized that a time from the determination that the engine speed NE is zero to the output of the crank angle sensor signal decreases as the engine speed NE immediately before the TDC stop determination increases.

Figure 3:
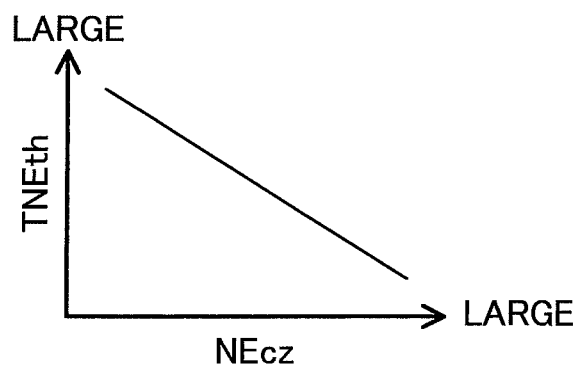
FIG. 3 shows a relationship between a last-acquired engine speed and a standby time.

Accordingly, when the present control device has determined that the TDC stop occurs upon the generation of the engine restart request, the present control device acquires, as a last engine speed NEcz, an engine speed NE acquired on the basis of the pulse signal lastly output from the crank angle sensor 74. Further, the present control device acquires a standby time TNEth in accordance with a relationship shown in FIG. 3 on the basis of the acquired last engine speed NEcz. As shown in FIG. 3, as the last engine speed NEcz increases, the acquired standby time TNEth decreases.

In addition, the present control device measures, as an elapsed time TNE, a time elapsing from the determination that the engine speed NE is zero. Then, when a crank angle sensor signal is output before the elapsed time TNE reaches the standby time TNEth, the present control device executes the ignition engine start control to cause the engine operation to start. On the other hand, when no crank angle sensor signal is output before the elapsed time TNE reaches the standby time TNEth, the present control device executes the starter engine start control to cause the engine operation to start.

The summary of the engine start control executed by the present control device has been described. Now, referring to FIGS. 4 and 5, the engine start control executed when it has been determined that the TDC stop occurs upon the generation of the engine restart request will be described, associated with the engine stop control.

Figure 4:
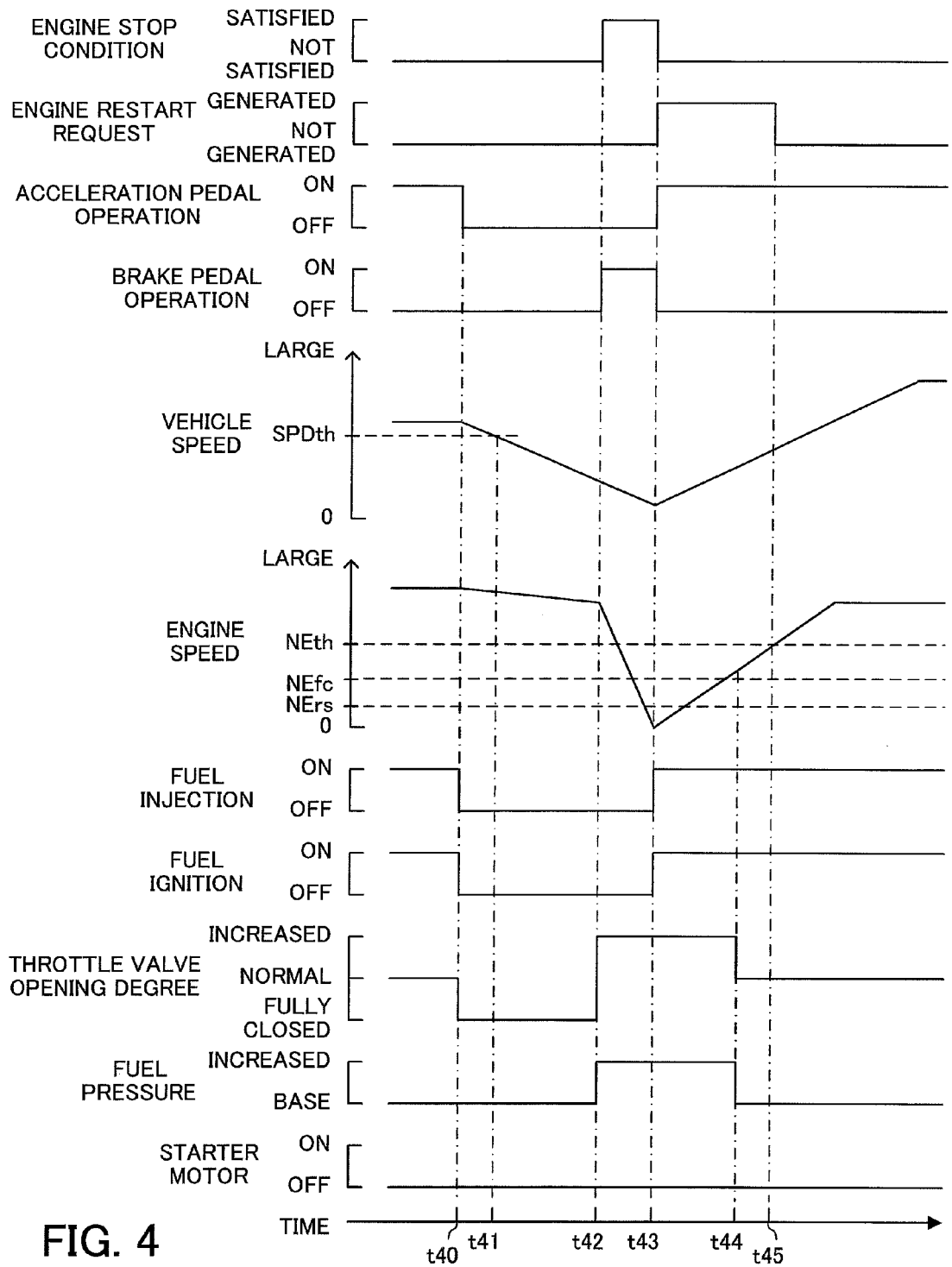
FIG. 4 shows a time chart used for describing an engine start control (i.e., a start of the engine operation by an ignition engine start control) executed by the control device according to the embodiment.

In an example shown in FIG. 4, the engine operation is started by the execution of the ignition engine start control. In this example, until a time t40, the acceleration pedal 91 has been depressed. In other words, until the time t40, the operation state of the acceleration pedal 91 is the ON-state and thus, the acceleration pedal operation amount Accp is larger than zero. Therefore, until the time t40, the engine stop condition has not been satisfied and thus, the present control device sends command signals to the fuel injectors 39 and the the ignition devices 35, respectively to carry out the fuel injections and the fuel ignitions.

In this example, at the time t40, the acceleration pedal 91 is released. In other words, at the time t40, the operation state of the acceleration pedal 91 is changed to the OFF-state and the acceleration pedal operation amount Accp becomes zero. At this time, the engine speed NE is equal to or larger than a fuel-cut engine speed NEfc and thus, a fuel-cut condition is satisfied.

When the fuel-cut condition is satisfied, the present control device starts executing a fuel-cut control described later. In particular, the present control device stops the fuel injections and the fuel ignitions. Therefore, similar to the engine stop control, the fuel-cut control is a control for stopping the fuel injections and the fuel ignitions. However, the execution of the engine stop control is continued until the engine speed NE decreases to zero as far as the acceleration pedal 91 is released. On the other hand, the execution of the fuel-cut control is stopped when the engine speed NE decreases to below an engine restart engine speed NErs although the acceleration pedal 91 is released. In this point of view, the fuel-cut control is different from the engine stop control.

It should be noted that in this example, at the time t40, the brake pedal 92 is released (i.e, the operation state of the brake pedal 92 corresponds to the OFF-state and the brake pedal operation amount Brkp is zero) and the vehicle speed SPD is larger than the predetermined speed SPDth, the engine stop condition is not satisfied.

At a time t41, the vehicle speed SPD decreases to the predetermined speed SPDth. At this time, the brake pedal 92 is released. Therefore, at the time t41, the engine stop condition is not satisfied. However, since the acceleration pedal 91 is released, the present control device continues to execute the fuel-cut control.

Then, in this example, at a time t42, the brake pedal 92 is depressed or operated, that is, the operation state of the brake pedal 92 becomes the ON-state and the brake pedal operation amount Brkp becomes larger than zero. At this time, since the vehicle speed SPD is equal to or smaller than the predetermined speed SPDth, the engine stop condition is satisfied. Therefore, the present control device starts executing the engine stop control. In particular, the present control device stops the fuel injections and the fuel ignitions. It should be noted that in this example, at this time, the fuel injections and the fuel ignitions have been already stopped by the execution of the fuel-cut control. Thus, the present control device continues to stop the fuel injections and the fuel ignitions. Further, at this time, a clutch (not shown) of a vehicle equipped with the engine 10 is released and thus, no driving force is transmitted from the engine 10 to driving vehicle wheels.

In addition, when the engine stop condition is satisfied, the present control device increases the throttle valve opening degree TA to an opening degree larger than the present throttle valve opening degree TA (i.e., zero or a throttle valve opening degree previously learned for maintaining an idling engine operation, that is, an idling engine operation learned opening degree) and increases the fuel pressure PF to a pressure larger than the present fuel pressure PF (i.e, a base fuel pressure PFb which is a predetermined constant fuel pressure).

The purpose of such an increase of the throttle valve opening degree TA and the fuel pressure PF is to assuredly start the engine operation by executing the ignition engine start control when the start of the engine operation is requested (i.e., the engine restart request is generated) before the rotation of the crank shaft 24 is completely stopped by the execution of the engine stop control.

Then, in this example, at a time t43, the brake pedal 92 is released and the acceleration pedal 91 is depressed or operated. Thus, the engine restart request is generated. In this example, it is assumed that it has been determined that the TDC stop occurs upon the generation of the engine restart request. Further, the present control device measures the elapsed time TNE from the determination that the engine speed NE is zero.

When the engine restart request is generated at the time t43, the present control device acquires, as the last engine speed NEcz, the engine speed NE acquired on the basis of the pulse signal lastly output from the crank angle sensor 74 before the generation of the engine restart request. Hereinafter, the last pulse signal will be referred to as "the last signal". Further, the present control device acquires the standby time TNEth in accordance with the relationship shown in FIG. 3 on the basis of the acquired last engine speed NEcz. Then, the present control device monitors whether or not the crank angle sensor signal is output before the elapsed time TNE reaches the standby time TNEth.

FIG. 4 shows an example that the crank angle sensor signal is output before the elapsed time TNE reaches the standby time TNEth. Therefore, in this example, the present control device starts executing the ignition engine start control when the crank angle sensor signal is output.

In detail, the present control device causes the fuel injector 39 of a combustion stroke cylinder to inject fuel and the ignition device 35 to ignite the fuel. The combustion stroke cylinder corresponds to the cylinder in which the crank angle thereof is in the combustion stroke. Thereby, after the time t43, the engine speed NE increases and at a time t45, reaches the predetermined engine speed NEth (i.e, an engine start completion engine speed). Therefore, at this time, the start of the engine operation (i.e., the engine operation start) is completed. It should be noted that in this example, at a time t44 when the engine speed NE increases to a certain large engine speed after the time t43, the throttle valve opening degree TA is changed to an opening degree set by the execution of the normal control described below (see a step 1240 of FIG. 12 and a routine shown in FIG. 13) and the fuel pressure PF is set to the base fuel pressure PFb.

Figure 5:
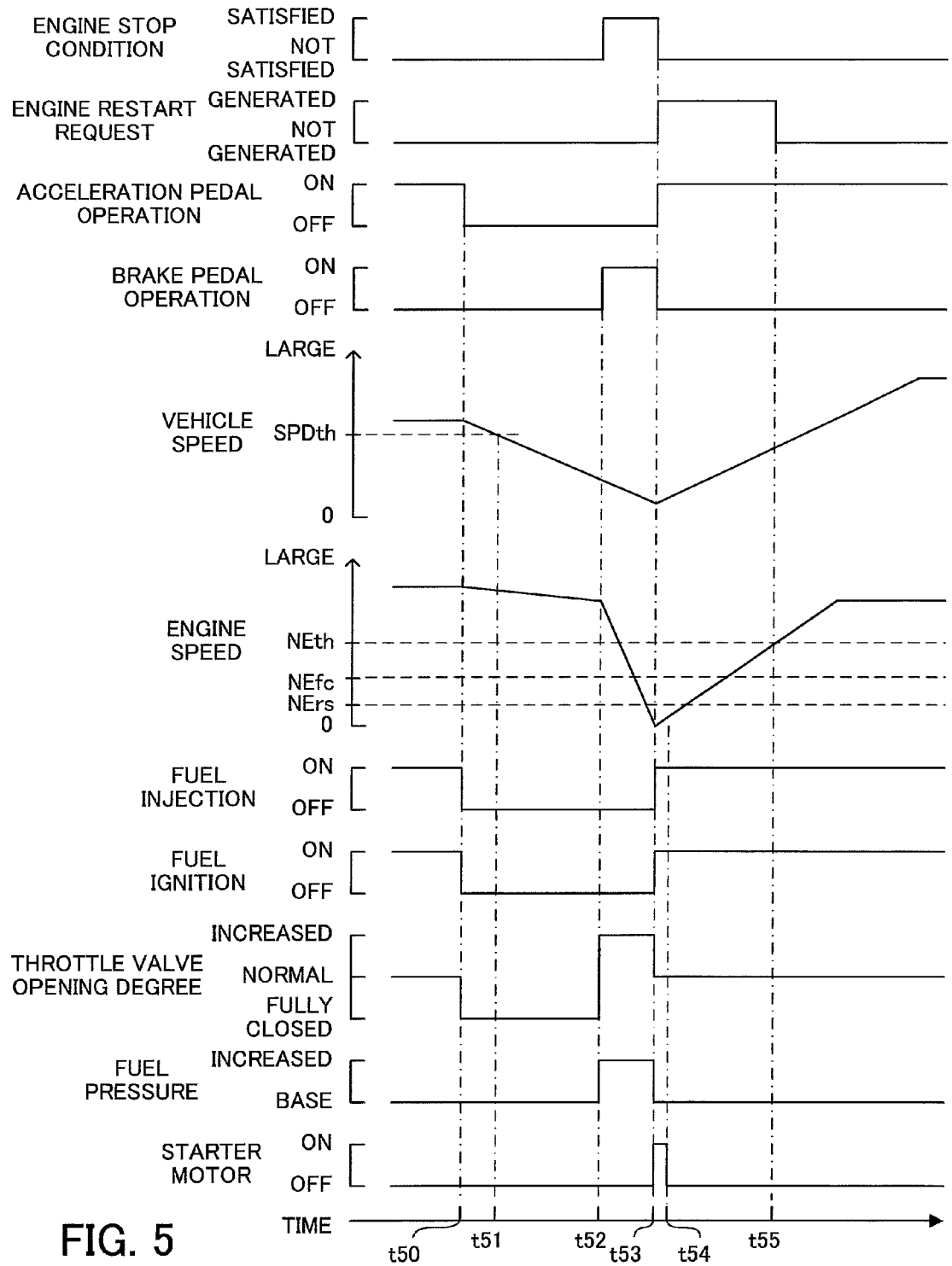
FIG. 5 shows a time chart used for describing an engine start control (i.e., a start of the engine operation by a starter engine start control) executed by the control device according to the embodiment.

On the other hand, FIG. 5 shows an example that the engine operation is started by the execution of the starter engine start control. In this example, the controls and the like until a time t53 upon the generation of the engine restart request are the same as the controls and the like until the time t43 upon the generation of the engine restart request in the example shown in FIG. 4. Also, in the example shown in FIG. 5, it has been determined that the TDC stop occurs at the time t53 upon the generation of the engine restart request. Further, the present control device measures the elapsed time TNE from the determination that the engine speed NE is zero.

When the engine restart request is generated at the time t53, the present control device acquires, as the last engine speed NEcz, the engine speed NE acquired on the basis of the last signal. Further, the present control device acquires the standby time TNEth in accordance with the relationship shown in FIG. 3 on the basis of the acquired last engine speed NEcz. Then, the present control device monitors whether or not the crank angle sensor signal is output before the elapsed time TNE reaches the standby time TNEth.

In the example shown in FIG. 5, no crank angle sensor signal is output before the elapsed time TNE reaches the standby time TNEth. Therefore, in this example, the present control device starts executing the starter engine start control when the elapsed time TNE reaches the standby time TNEth.

In particular, the present control device causes the starter motor 26 to mesh with the ring gear 27 secured to the crank shaft 24 to apply a rotation torque to the crank shaft 24 via the ring gear 27 and causes the fuel injector 39 to carry out the fuel injection in the latter half of the compression stroke and the ignition device 35 to carry out the fuel ignition immediately after the fuel injection.

Thereby, after the time t53, the engine speed NE increases. Then, at a time t55, the engine speed NE reaches the predetermined engine speed NEth (i.e., the engine start completion engine speed) and thus, the start of the engine operation is completed. It should be noted that the activation of the starter motor 26 is stopped at a time t54 when the engine speed NE increases to a constant large engine speed. On the other hand, the fuel injection and the fuel ignition are continued to be carried out after the time t54.

According to the setting of the standby time TNEth carried out by the present control device, it is possible to increase an opportunity of starting the engine operation by executing the ignition engine start control without excessively delaying the timing of starting the engine operation by executing the starter engine start control. The reasons for obtaining such a technical effect are as follows.

As described above, after the TDC stop determination is made, the crank shaft 24 may start to rotate in the inverse direction or the crank shaft 24 may continue to rotate in the normal direction. In this regard, the inventors of this application has realized that a time taken until the crank angle sensor signal is output from the time of making the TDC stop determination decreases as the last engine speed NEcz increases. It can be expected that such a phenomenon occurs for the following reasons. It should be noted that hereinafter, the time taken until the crank angle sensor signal is output from the time of making the TDC stop determination will be referred to as "the post-engine-stop-determination signal output time dTsig".

When the last engine speed NEcz is large, the inertia of the rotation of the crank shaft 24 is large. In this case, the piston 22, which moves toward the compression TDC immediately before the rotation of the crank shaft 24 stops, can further move, thereby to approach the compression TDC.

In this regard, when the piston 22 of the TDC stop cylinder stops immediately before the compression TDC upon the time of making the TDC stop determination, a pressure in the TDC stop cylinder (i.e., an in-cylinder pressure of the TDC stop cylinder) is high. As a result, the piston 22 is likely to move in the inverse direction (i.e., in a direction away from the compression TDC) within a relatively short time after the piston 22 stops. Thus, when the last engine speed NEcz is large, the post-engine-stop-determination signal output time dTsig is short.

On the other hand, when the rotation inertia of the crank shaft 24 is large under the condition that the piston 22 of the TDC stop cylinder moves toward the compression TDC extremely slowly upon the time of making the TDC stop determination immediately before the compression TDC, the piston 22 is likely to move beyond the compression TDC. As a result, the piston 22 moves beyond the compression TDC within a relatively short time. Thus, when the last engine speed NEcz is large, the post-engine-stop-determination signal output time dTsig is short.

Furthermore, when the rotation inertia of the crank shaft 24 is large under the condition that the piston 22 of the TDC stop cylinder moves extremely slowly upon the time of making the TDC stop determination immediately after the compression TDC, the piston 22 eventually moves fast. Thus, when the last engine speed NEcz is large, the post-engine-stop-determination signal output time dTsig is short.

In this manner, when the last engine speed NEcz is large, the post-engine-stop-determination signal output time dTsig is short. In other words, when the last engine speed NEcz is small, the post-engine-stop-determination signal output time dTsig is long. Therefore, when the standby time TNEth is set to a long time under the condition that the last engine speed NEcz is small, the rotation of the crank shaft 24 is likely to be confirmed. Thus, it is possible to increase an opportunity of starting the engine operation by executing the ignition engine start control.

On the other hand, even when the standby time TNEth is set to a short time under the condition that the last engine speed NEcz is large, the rotation of the crank shaft 24 is likely to be confirmed until the standby time TNEth elapses. As a result, the engine operation is likely to be started by the execution of the ignition engine start control. Even if the rotation of the crank shaft 24 is not confirmed, since the standby time TNEth is short, the timing of starting the engine operation by executing the starter engine start control is not excessively delayed.

For the reasons, the setting of the standby time TNEth carried out by the present control device can increase the opportunity of starting the engine operation by executing the ignition engine start control without excessively delaying the timing of starting the engine operation by executing the starter engine start control.

<Concrete Engine Start Control>

Next, the concrete engine start control executed by the present control device and the acquisition of the engine speed will be described. The CPU of the ECU 80 is configured or programmed to execute an engine speed acquisition routine shown by a flowchart in FIG. 6.

It should be noted that when a pulse signal is output from the crank angle sensor 74 before the predetermined determination time TSGth elapses after the previous crank angle sensor signal is output, the CPU starts this routine. On the other hand, when the predetermined determination time TSGth elapses while no pulse signal is output from the crank angle sensor 74 after the previous crank angle sensor signal is output, the CPU terminates the execution of this routine.

Figure 6:
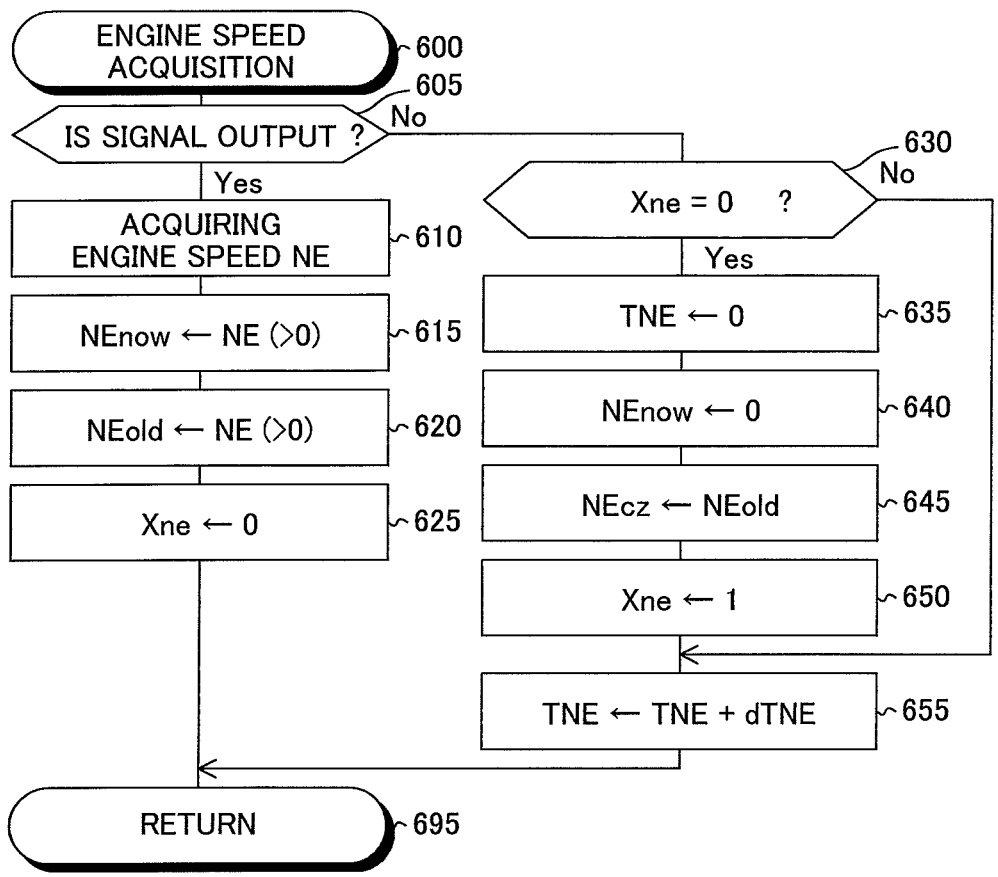
FIG. 6 shows a flowchart of an engine speed acquisition routine executed by a CPU shown in FIG. 1.

Therefore, at a predetermined timing, the CPU starts a process from a step 600 of FIG. 6 and then, proceeds with the process to a step 605 to determine whether or not a crank angle sensor signal is output.

When the crank angle sensor signal is output, that is, when this routine is started in response to the output of the crank angle sensor signal, the CPU determines "Yes" at the step 605 and then, sequentially executes processes of steps 610 to 625 described below.

Step 610: The CPU acquires an engine speed NE on the basis of the pulse signal output at this time from the crank angle sensor 74.

Step 615: The CPU stores the engine speed NE acquired at the step 610 as a present engine speed NEnow in the backup RAM of the ECU 80.

Step 620: The CPU stores the engine speed NE acquired at the step 610 as a previous engine speed NEold in the backup RAM.

Step 625: The CPU sets a value of a measurement flag Xne to "0". The measurement flag Xne indicates whether or not carried out is a measurement of the elapsed time THE elapsing from the determination that the engine speed NE is zero. The value of the measurement flag Xne is set to "1" when the engine speed NE is zero. On the other hand, the value of the measurement flag Xne is set to "0" when the engine speed NE is larger than zero.

Then, the CPU proceeds with the process to a step 695 to terminate the execution of this routine once.

To the contrary, when no crank angle sensor signal is output upon the execution of the process of the step 605 by the CPU, that is, when this routine is started since no crank angle sensor signal is output before the predetermined determination time TSGth elapses, the CPU determines "No" at the step 605 and then, proceeds with the process to a step 630.

It should be noted that the fact that the CPU determines "No" at the step 605 corresponds to a fact that the CPU determines that the engine speed NE is zero.

When the CPU proceeds with the process to the step 630, the CPU determines whether or not the value of the measurement flag Xne is "0". When the value of the measurement flag Xne is "0", the CPU determines "Yes" at the step 630 and then, sequentially executes processes of steps 635 to 655 described below.

To the contrary, when the value of the measurement flag Xne is "1" upon the execution of the process of the step 630 by the CPU, the CPU determines "No" at the step 630 and then, executes a process of a step 655 described below.

Step 635: The CPU clears the elapsed time TNE.

Step 640: The CPU stores the present engine speed NE (that is, zero) as the present engine speed NEnow in the backup RAM.

Step 645: The CPU stores the previous engine speed NEold stored in the backup RAM as the last engine speed NEcz in the backup RAM.

Step 650: The CPU sets the value of the measurement flag Xne to "1".

Step 655: The CPU increases the elapsed time TNE by a predetermined time dTNE and stores this increased elapsed time TNE in the backup RAM.

Then, the CPU proceeds with the process to the step 695 to terminate the execution of this routine once.

The concrete acquisition of the engine speed carried out by the present control device has been described. According to this acquisition, until the engine speed NE becomes zero, the engine speed NE acquired at the step 610 is stored as the present engine speed NEnow in the backup RAM. On the other hand, when it is determined that the engine speed NE is zero (see the case that the determination of the step 605 of FIG. 6 is "No"), zero is stored as the present engine speed NEnow in the backup RAM and the previous engine speed NEold is stored as the last engine speed NEcz in the backup RAM.

Figure 7:
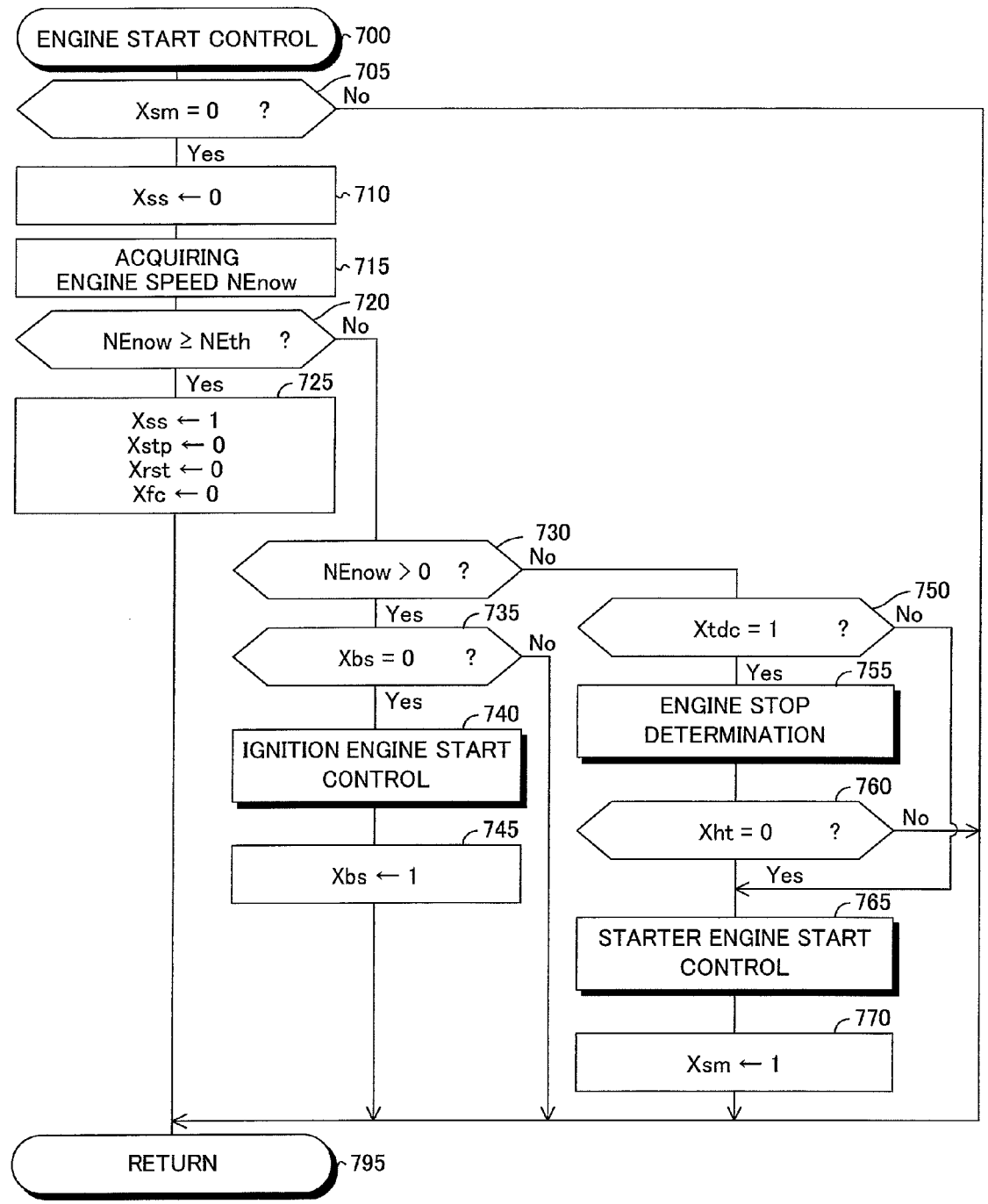
FIG. 7 shows a flowchart of an engine start control routine executed by the CPU shown in FIG. 1.

Further, the CPU of the ECU 80 is configured or programmed to execute an engine start control routine shown by a flowchart in FIG. 7 when an engine start condition described later is satisfied every an elapse of a predetermined time, that is, when a value of a fuel-cut flag Xfc described later is "0", a value of an engine stop request flag Xstp described later is "1" and a value of an engine restart request flag Xrst described later is "1" every an elapse of a predetermined time. It should be noted that the routine shown in FIG. 7 is a routine executed as a process of a step 1235 of FIG. 12 described later.

Therefore, when the CPU proceeds with a process to the step 1235 of FIG. 12 described later, the CPU starts a process from a step 700 of FIG. 7 and then, proceeds with the process to a step 705 to determine whether or not the value of a starter engine start flag Xsm is "0". As described later, the value of the starter engine start flag Xsm is set to "1" when the execution of the starter engine start control is started.

Therefore, at the present, the value of the starter engine start flag Xsm is "0". Thus, the CPU determines "Yes" at the step 705 and then, proceeds with the process to a step 710 to set a value of an engine start completion flag Xss to "0". It should be noted that the value of the starter engine start flag Xsm is "1", the CPU determines "No" at the step 705 and then, proceeds with the process directly to a step 795. Further, the CPU proceeds with the process to a step 1295 of FIG. 12 via the step 795.

Then, the CPU proceeds with a step 715 to acquire the present engine speed NEnow from the backup RAM and then, proceeds with the process to a step 720.

When the CPU proceeds with the process to the step 720, the CPU determines whether or not the present engine speed NEnow acquired at the step 715 is equal to or larger than the predetermined engine speed NEth. When the present engine speed NEnow is equal to or larger than the predetermined engine speed NEth, the CPU determines "Yes" and then, proceeds with the process to a step 725 to execute following processes (1) to (4). Then, the CPU proceeds with the process to the step 1295 of FIG. 12 via the step 795.

(1) The CPU sets the value of the engine start completion flag Xss to "1". In other words, the CPU determines that the start of the engine operation is completed.

(2) The CPU sets the value of the engine stop request flag Xstp to "0".

(3) The CPU sets the value of the engine restart request flag Xrst to "0".

(4) The CPU sets the value of the fuel-cut flag Xfc to "0".

Figure 12:
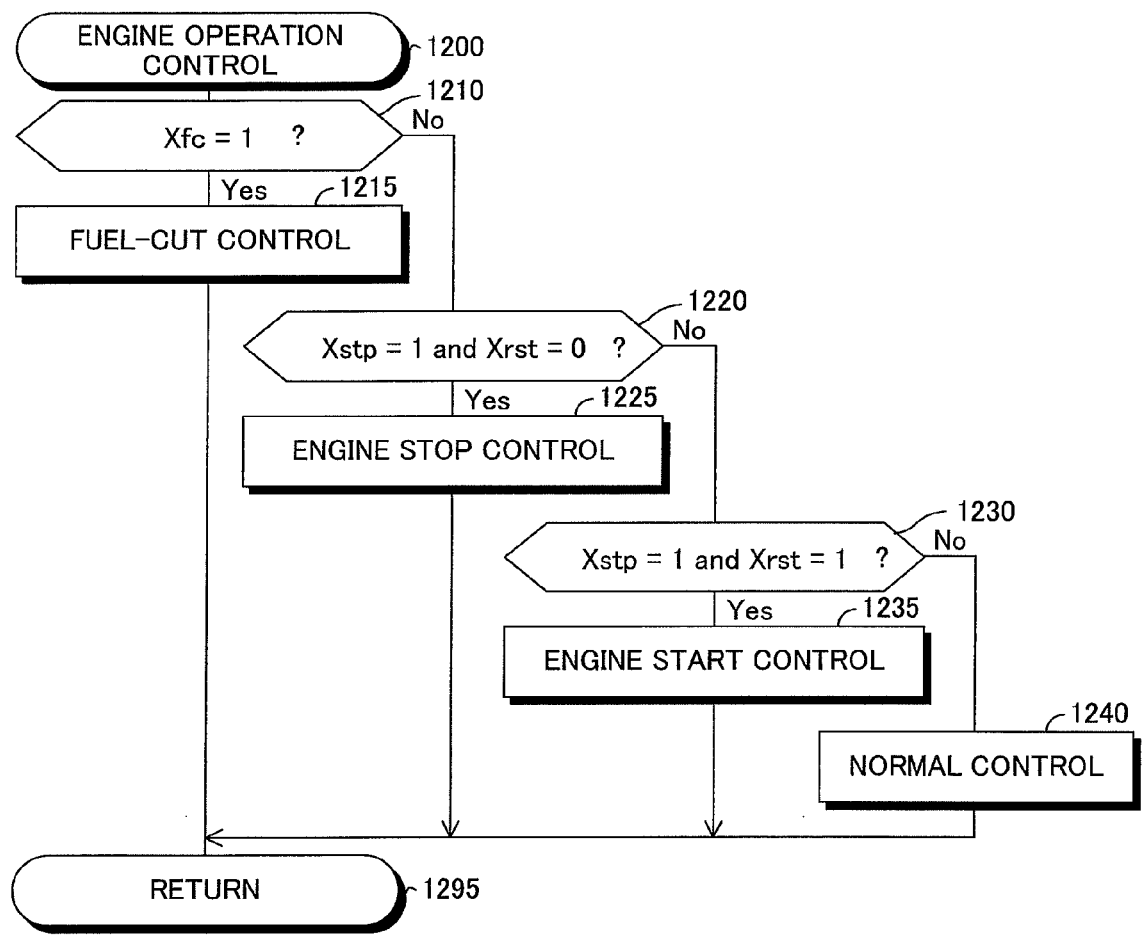
FIG. 12 shows a flowchart of an engine operation control routine executed by the CPU shown in FIG. 1.

As a result, when the CPU starts the process of the routine shown in FIG. 12 next time, the CPU determines "No" at a steps 1210, 1220 and 1230, respectively and then, proceeds with the process to a step 1240. As a result, the engine operation is started by the execution of the normal control.

To the contrary, when the present engine speed NEnow is smaller than the predetermined engine speed NEth upon the execution of the process of the step 720, the CPU determines "No" at the step 720 and then, proceeds with the process to a step 730 to determine whether or not the present engine speed NEnow acquired at the step 715 is larger than zero.

When the present engine speed NEnow is larger than zero upon the execution of the process of the step 730, the CPU determines "Yes" at the step 730 and then, proceeds with the process to a step 735 to determine whether or not a value of an ignition engine start flag Xbs is "0". As described later, the value of the ignition engine start flag Xbs is set to "1" when the execution of the ignition engine start control is started.

Therefore, at present, the value of the ignition engine start flag Xbs is "0". Thus, the CPU determines "Yes" at the step 735 and then, proceeds with the process to a step 740 to execute an ignition engine start control routine shown in FIG. 8. It should be noted that when the value of the ignition engine start flag Xbs is "1" upon the execution of the process of the step 735, the CPU determines "No" at the step 735 and then, proceeds with the process to the step 1295 of FIG. 12 via the step 795.

When the CPU proceeds with the process to the step 740, the CPU starts a process from a step 800 of FIG. 8 and then, sequentially executes processes of steps 805 to 840. Then, the CPU proceeds with the process to a step 745 of FIG. 7 via a step 895.

Step 805: The CPU acquires an absolute crank angle CA. As described above, the absolute crank angle CA corresponds to a crank angle of the engine 10 with respect to the compression TDC of the predetermined cylinder.

Step 810: The CPU determines the combustion stroke cylinder on the basis of the absolute crank angle CA acquired at the step 805. As described above, the absolute crank angle CA corresponds to a crank angle of the engine 10 with respect to the compression TDC of the predetermined cylinder on the basis of the signals output from the crank angle sensor 74 and the cam position sensor not shown. Therefore, since the crank angle of each of the cylinders can be acquired by using the absolute crank angle CA, it is possible to determine which cylinder corresponds to the combustion stroke cylinder. Hereinafter, the combustion stroke cylinder will be referred to as "the particular cylinder".

Step 815: The CPU sets a target fuel injection amount QFck for the ignition engine start control as a target fuel injection amount QFtgt. The target fuel injection amount QFck for the ignition engine start control is acquired by an experiment and is previously stored in the ROM. It should be noted that the target fuel injection amount QFck for the ignition engine start control may be a value which increases as the cooling water temperature THIN decreases. Hereinafter, the target fuel injection amount QFck for the ignition engine start control will be referred to as "the ignition engine start fuel injection amount QFck".

Step 820: The CPU sets a target fuel injection timing TFck for the ignition engine start control as a target fuel injection timing TFtgt. The target fuel injection timing TFck for the ignition engine start control is in the first half of the combustion stroke in a cylinder where the fuel injection and the fuel ignition are carried out by the execution of the ignition engine start control. The target fuel injection timing TFck for the ignition engine start control is acquired by an experiment and is previously stored in the ROM. Hereinafter, the target fuel injection timing TFck for the ignition engine start control will be referred to as "the ignition engine start fuel injection timing TFck".

Step 825: The CPU sets a target fuel ignition timing Tick for the ignition engine start control as a target fuel ignition timing TItgt. The target fuel ignition timing Tick for the ignition engine start control corresponds to a timing immediately after the ignition engine start fuel injection timing TFck set as the target fuel injection timing TFtgt at the step 820. The target fuel ignition timing Tick for the ignition engine start control is acquired by an experiment and is previously stored in the ROM. Hereinafter, the target fuel ignition timing Tick for the ignition engine start control will be referred to as "the ignition engine start fuel ignition timing Tick".

Step 830: The CPU sets a value obtained by adding a predetermined value dTA to a fuel-cut opening degree TAfc described later as a target throttle valve opening degree TAtgt (TAtgt=TAfc+dTA).

Figure 15:
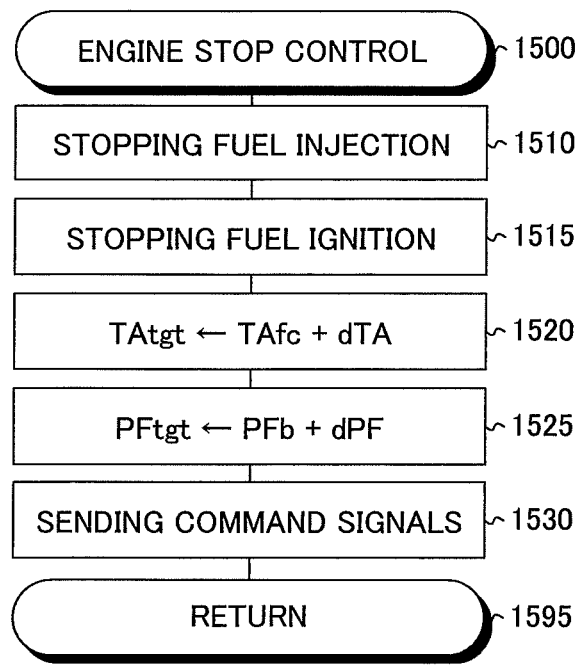
FIG. 15 shows a flowchart of an engine stop control routine executed by the CPU shown in FIG. 1.

It should be noted that when this routine is executed, the target throttle valve opening degree TAtgt has been set to an opening degree which is larger than the fuel-cut opening degree TAfc by the predetermined value dTA (see a step 1520 of FIG. 15). Therefore, in this step 830, the target throttle valve opening degree TAtgt is maintained at the target throttle valve opening degree TAtgt set by the engine stop control which has been executed until the engine restart request is generated.

Step 835: The CPU sets a value obtained by adding a predetermined value dPF to the base fuel pressure PFb as a target fuel pressure PFtgt (PFtgt=PFb+dPF).

It should be noted that as described above, when this routine is executed, the target fuel pressure PFtgt has been set to a fuel pressure which is higher than the base fuel pressure PFb by the predetermined value dPF (see a step 1525 of FIG. 15). Therefore, in this step 835, the target fuel pressure PFtgt is maintained at the target fuel pressure PFtgt set by the engine stop control which has been executed until the engine restart request is generated.

Step 840: The CPU sends command signals to the fuel injector 39, the ignition device 35, the throttle valve actuator 45*a* and the high pressure fuel pump 62 in accordance with the target fuel injection amount QFtgt, the target fuel injection timing TFtgt, the target fuel ignition timing TItgt, the target throttle valve opening degree TAtgt and the target fuel pressure PFtgt set at the steps 815 to 835, respectively.

Thereby, while the throttle valve opening degree TA and the fuel pressure PF are controlled to the target throttle valve opening degree TAtgt and the target fuel pressure PFtgt, respectively, the target fuel injection amount QFtgt of the fuel is injected from the fuel injector 39 at the target fuel injection timing TFtgt corresponding to a timing in the first half of the combustion stroke and the fuel is ignited by the ignition device 35 at the target fuel ignition timing TItgt corresponding to a timing immediately after the fuel injection.

Then, the CPU proceeds with the process to a step 745 of FIG. 7 via the step 895 to set the value of the ignition engine start flag Xbs to "1". Therefore, when the CPU proceeds with the process to the step 735 next time, the CPU does not execute the process of the step 740 and thus, the ignition engine control is not executed.

Then, the CPU proceeds with the process to the step 1295 of FIG. 12 via the step 795.

On the other hand, when the present engine speed NEnow is zero upon the execution of the process of the step 730 of FIG. 7 by the CPU, the CPU determines "No" at the step 730 and then, proceeds with the process to a step 750 to determine whether or not a value of a TDC flag Xtdc is "1". The TDC flag Xtdc indicates whether or not it has been determined that the crank angle of any of the cylinders corresponds to the compression TDC. The value of the TDC flag Xtdc is set to "1" when it is determined that the crank angle of any of the cylinders corresponds to the compression TDC and is set to "0" when it is not determined that the crank angle of any of the cylinders corresponds to the compression TDC.

Figure 9:
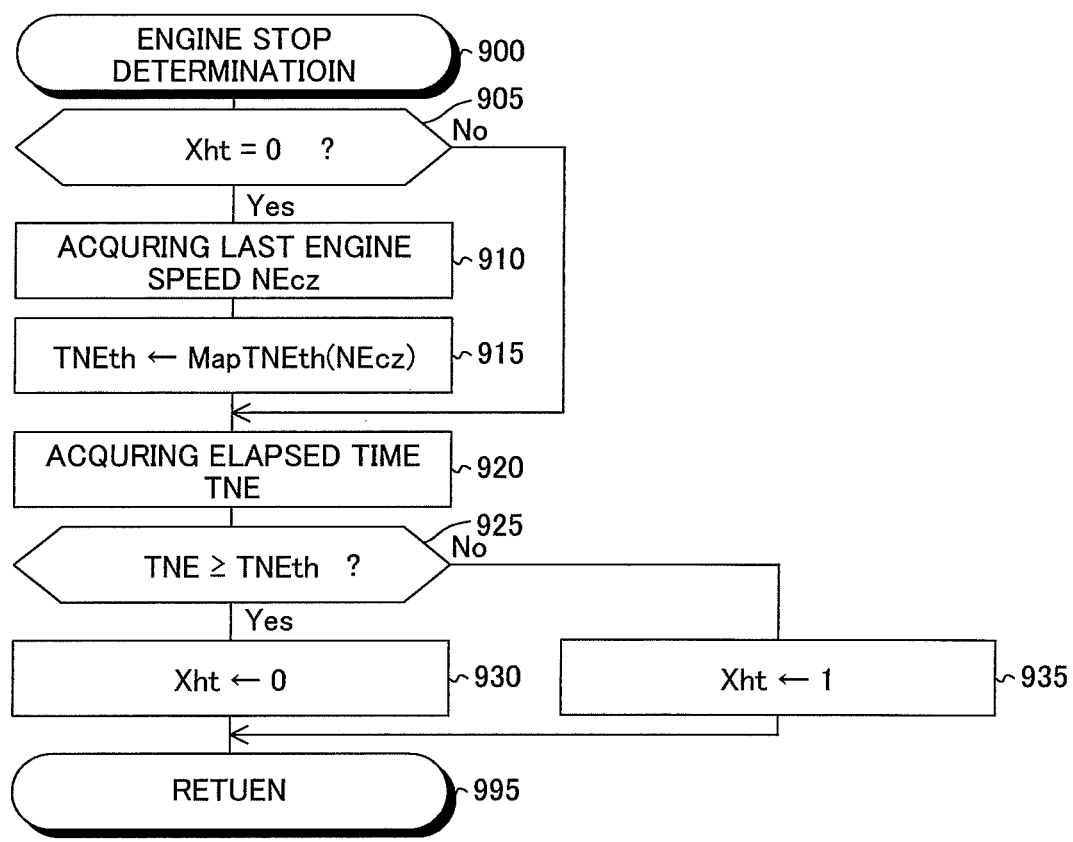
FIG. 9 shows a flowchart of an engine stop determination routine executed by the CPU shown in FIG. 1.

When the value of the TDC flag Xtdc is "1" upon the execution of the process of the step 750 by the CPU, the CPU determines "Yes" at the step 750 and then, proceeds with the process to a step 755 to execute an engine stop determination routine shown by a flowchart in FIG. 9.

Therefore, when the CPU process with the process to the step 755, the CPU starts a process from a step 900 of FIG. 9 and then, proceeds with the process to a step 905 to determine whether or not a value of an engine stop determining flag Xht is "0".

When the value of the engine stop determining flag Xht is "0", the CPU determines "Yes" at the step 905 and then, sequentially executes processes of steps 910 and 920 described below.

On the other hand, when the value of the engine stop determining flag Xht is "1", the CPU determines "No" at the step 905 and then, executes the process of the step 920 described below.

Step 910: The CPU acquires the last engine speed NEcz from the backup RAM. The last engine speed NEcz is stored in the backup RAM at the step 645 of FIG. 6 described above.

Step 915: The CPU applies the last engine speed NEcz to a lookup table MapTNEth(NEcz) to acquire the standby time TNEth. According to the table MapTNEth(NEcz), the acquired standby time TNEth decreases as the last engine speed NEcz increases (see FIG. 3).

Step 920: The CPU acquires the elapsed time TNE. The elapsed time TNE is stored in the backup RAM at the step 655 of FIG. 6 described above.

Then, the CPU proceeds with the process to a step 925 to determine whether or not the elapsed time TNE is equal to or larger than the standby time TNEth. When the elapsed time TNE is equal to or larger than the standby time TNEth, that is, when the rotation of the crank shaft 24 (i.e., the engine operation) stops completely, the CPU determines "Yes" at the step 925 and then, proceeds with the process to a step 930 to set the value of the engine stop determining flag Xht to "0".

Then, the CPU proceeds with the process to a step 760 of FIG. 7 via a step 995. In this case, the CPU determines "Yes" at the step 760 of FIG. 7 and then, proceeds with the process to a step 765 to execute a starter engine start control routine shown by a flowchart in FIG. 10 described later.

On the other hand, when the elapsed time TNE is smaller than the standby time TNEth upon the execution of the process of the step 925 by the CPU, that is, when the CPU should not determine whether or not the rotation of the crank shaft 24 (i.e., the engine operation) completely stops, the CPU determines "No" at the step 925 and then, proceeds with the process to a step 935 to set the value of the engine stop determining flag Xht to "1".

Then, the CPU proceeds with the process to the step 760 of FIG. 7 via the step 995. In this case, the CPU determines "No" at the step 760 of FIG. 7 and then, proceeds with the process directly to the step 795.

When the CPU proceeds with the process to the step 760, the CPU determines whether or not the value of the engine stop determining flag Xht is "0". When the value of the engine stop determining flag Xht is "1", the determination of whether or not the engine operation (the rotation of the crank shaft 24) stops completely has not be completed. Therefore, the CPU determines "No" at the step 760 and then, proceeds with the process to the step 1295 of FIG. 12 via the step 795.

On the other hand, when the value of the engine stop determining flag Xht is "0", it has been determined that the engine operation stops completely. Therefore, the CPU determines "Yes" at the step 760 and then, proceeds with the process to the step 765 to execute a starter engine start control routine shown in FIG. 10.

It should be noted that when the value of the TDC flag Xtdc is "0" upon the execution of the process of the step 750 by the CPU, the CPU determines "No" at the step 750 and then, proceeds with the process directly to the step 765.

When the CPU proceeds with the process to the step 765, the CPU starts a process from a step 1000 and then, sequentially executes processes of steps 1005 to 1030 described below. Then, the CPU proceeds with the process to a step 770 of FIG. 7 via a step 1095.

Step 1005: The CPU applies the cooling water temperature THW to a lookup table MapQFtgt(THW) to acquire the target fuel injection amount QFtgt. According to the table MapQFtgt(THW), the acquired target fuel injection amount QFtgt decreases as the cooling water temperature THW increases. As the cooling water temperature THW increases, the temperature in the combustion chamber 25 increases and thus, the injected fuel is likely to vaporize. Therefore, a sufficient explosion power can be achieved by a small injection amount of the fuel. For this reason, the acquired fuel injection amount QFtgt decreases as the cooling water temperature THW increases.

Step 1010: The CPU applies the cooling water temperature THW to a lookup table MapTFtgt(THW) to acquire the target fuel injection timing TFtgt. According to the table MapTFtgt(THW), the acquired target fuel injection timing TFtgt becomes close to the compression TDC in the latter half of the compression stroke as the cooling water temperature THW increases. As the cooling water temperature THW increases, the temperature in the combustion chamber 25 increases and thus, the injected fuel can vaporize sufficiently for a short time. For this reason, the acquired target fuel injection timing TFtgt becomes close to the compression TDC as the cooling water temperature THW increases.

Step 1015: The CPU applies the target fuel injection amount QFtgt, the target fuel injection timing TFtgt and the cooling water temperature THW to a lookup table MapTItgt (QFtgt,TFtgt,THW) to acquire the target fuel ignition timing TItgt. According to the table MapTItgt(QFtgt,TFtgt,THW), the acquired target fuel ignition timing TItgt delays as the target fuel injection amount QFtgt increases. Further, the acquired target fuel ignition timing TItgt advances as the target fuel injection timing TFtgt advances. Furthermore, the acquired target fuel ignition timing TItgt advances as the cooling water temperature THW increases.

As the fuel injection amount increases, it takes long time for the fuel to vaporize sufficiently. For this reason, the acquired target fuel ignition timing TItgt delays as the target fuel injection amount QFtgt increases. Further, as the target fuel injection timing TFtgt advances, the timing of the sufficient vaporization of the fuel advances. For this reason, the acquired target fuel ignition timing TItgt advances as the target fuel injection timing TFtgt advances. Furthermore, as the cooling water temperature THW increases, the fuel can vaporize for a short time. For this reason, the acquired target fuel ignition timing TItgt advances as the cooling water temperature THW increases.

Step 1020: The CPU applies the target fuel injection amount QFtgt to a lookup table MapTAtgt(QFtgt) to acquire the target throttle valve opening degree TAtgt. According to the table MapTAtgt(QFtgt), the acquired target throttle valve opening degree TAtgt can cause an air-fuel ratio of a mixture gas formed in each of the combustion chambers 25 to be a predetermined air-fuel ratio, in this example, an air-fuel ratio richer than the stoichiometric air-fuel ratio. Further, the acquired target throttle valve opening degree TAtgt increases as the target fuel injection amount QFtgt increases.

Step 1025: The CPU sets the base fuel pressure PFb as the target fuel pressure PFtgt.

Step 1030: The CPU sends command signals to the fuel injector 39, the the ignition device 35, the throttle valve actuator 45*a* and the high pressure fuel pump 62 in accordance with the target fuel injection amount QFtgt, the target fuel injection timing TFtgt, the target fuel ignition timing TItgt, the target throttle valve opening degree TAtgt and the target fuel pressure PFtgt and sends a command signal to the starter motor 26.

Thereby, the throttle valve opening degree TA is controlled to the target throttle valve opening degree TAtgt while the fuel pressure PF is controlled to the target fuel pressure PFtgt. In addition, while a rotation torque is applied to the crank shaft 24 by the starter motor 26, the target fuel injection amount QFtgt of the fuel is injected from the fuel injector 39 at the target fuel injection timing TFtgt which is in the latter half of the compression stroke and the fuel is ignited by the respective ignition device 35 at the target fuel ignition timing TItgt which is around the compression TDC immediately after the target fuel injection timing TFtgt.

Then, the CPU proceeds with the process to a step 770 of FIG. 7 via a step 1095 to set the value of the starter engine start flag Xsm to "1". Then, the CPU proceeds with the process to the step 1295 of FIG. 12 via the step 795.

According to the engine start control routine of FIG. 7, when the present engine speed NEnow becomes larger than zero, that is, the crank angle sensor signal is output before the elapsed time THE becomes equal to or larger than the standby time TNEth, the CPU determines "Yes" at the step 730 of FIG. 7. At this time, the ignition engine start control is not executed and the value of the ignition engine start flag Xbs is "0". Therefore, the CPU determines "Yes" at the step 735 and then, proceeds with the process to the step 740 to execute the ignition engine start control. In other words, according to the engine start control routine of FIG. 7, when the present engine speed NEnow becomes larger than zero before the elapsed time THE becomes equal to or larger than the standby time TNEth, the ignition engine start control is executed.

<Engine Start Completion Determination>

Figure 11:
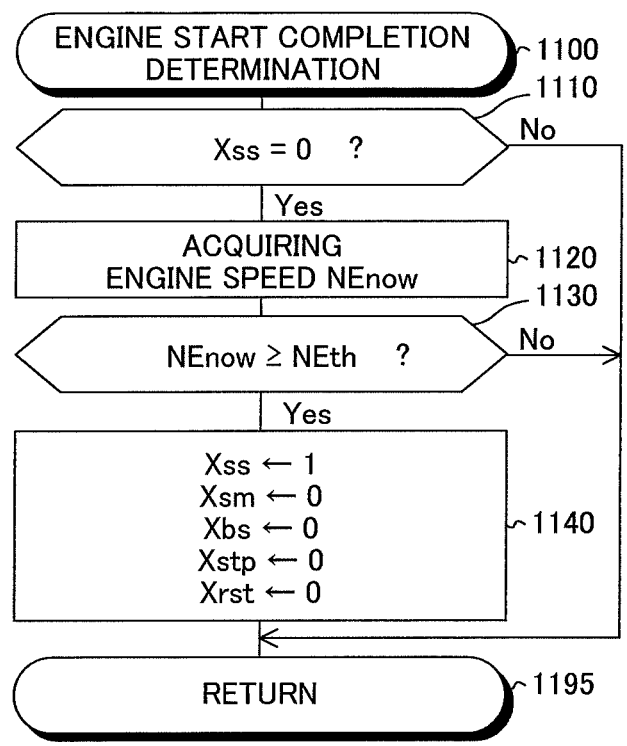
FIG. 11 shows a flowchart of an engine start completion determination routine executed by the CPU shown in FIG. 1.

Further, the CPU is configured or programmed to execute an engine start completion determination routine shown by a flowchart in FIG. 11 every a lapse of a predetermined time period. Therefore, at a predetermined timing, the CPU starts a process from a step 1100 of FIG. 11 and then, proceeds with the process to a step 1110 to determine whether or not a value of an engine start completion flag Xss is "0". The engine start completion flag Xss indicates whether or not the start of the engine operation is completed after the engine restart request is generated. When the value of the engine start completion flag Xss is "0", the engine start completion flag Xss indicates that the start of the engine operation is not completed.

When the value of the engine start completion flag Xss is "1" upon the execution of the process of the step 1110 by the CPU, the CPU determines "No" at the step 1110 and then, proceeds with the process to a step 1195 to terminate the execution of this routine once.

On the other hand, when the value of the engine start completion flag Xss is "0", the CPU determines "Yes" at the step 1110 and then, proceeds with the process to a step 1120 to acquire the present engine speed NEnow from the backup RAM.

Then, the CPU proceeds with the process to a step 1130 to determine whether or not the present engine speed NEnow is equal to or larger than the predetermined engine speed NEth. When the present engine speed NEnow is smaller than the predetermined engine speed NEth, the start of the engine operation is not completed. Therefore, in this case, the CPU determines "No" at the step 1130 and then, proceeds with the process to the step 1195 to terminate the execution of this routine once.

On the other hand, when the present engine speed NEnow is equal to or larger than the predetermined engine speed NEth, it can be determined that the start of the engine operation is completed. Therefore, in this case, the CPU determines "Yes" at the step 1130 and then, proceeds with the process to a step 1140 to execute following processes (1) to (5). Then, the CPU proceeds with the process to the step 1195 to terminate the execution of this routine once.

(1) The CPU sets the value of the engine start completion flag Xss to "1".

(2) The CPU sets the value of the starter engine start flag Xsm to "0".

(3) The CPU sets the value of the ignition engine start flag Xbs to "0".

(4) The CPU sets the value of the engine stop request flag Xstp to "0".

(5) The CPU sets the value of the engine restart request flag Xrst to "0".

As a result, when the CPU executes the routine of FIG. 12, the CPU proceeds with the process to the step 1240 of FIG. 12 and thus, the normal control is executed.

<Entire Engine Operation Control>

Next, the entire operation control of the engine 10 executed by the present control device will be explained. The CPU of the ECU 80 is configured or programmed to execute an engine operation control routine shown by a flowchart in FIG. 12 every a lapse of a predetermined time period. Therefore, at a predetermined timing, the CPU starts a process from a step 1200 of FIG. 12 and then, proceeds with the process to a step 1210 to determine whether or not the value of the fuel-cut flag Xfc is "1".

In this example, the value of the fuel-cut flag Xfc is set to "1" when a fuel-cut condition is satisfied. The fuel-cut condition is satisfied when all of following conditions (1) to (5) are satisfied.

(1) The acceleration pedal operation amount Accp is zero.

(2) The engine speed NE is equal to or larger than a predetermined engine speed (i.e. a fuel-cut engine speed) NEfc.

(3) The value of the engine stop request flag Xstp is "0".

(4) The value of the engine restart request flag Xrst is "0".

(5) The value of the engine start completion flag Xss is "1".

The value of the fuel-cut flag Xfc is set to "0" when a fuel-cut termination condition (i.e., a condition for terminating the execution of the fuel-cut control) is satisfied. The fuel-cut termination condition is satisfied when any of following conditions (1) to (5) is satisfied.

(1) The acceleration pedal operation amount Accp becomes larger than zero during the execution of the fuel-cut control (when the value of the fuel-cut flag Xfc is "1").

(2) The engine speed NE becomes equal to or smaller than a predetermined engine speed (i.e., an engine restart engine speed) NErs during the execution of the fuel-cut control.

(3) The value of the engine stop request flag Xstp is set to "1".

(4) The value of the engine restart request flag Xrst is set to "1".

(5) The value of the engine start completion flag Xss is set to "0".

The engine restart engine speed NErs is set to a value which is smaller than the fuel-cut engine speed NEfc and is larger than the idling engine speed NEid. In addition, the engine restart engine speed NErs corresponds to a lower value of the engine speed capable of causing the engine speed NE to converge on the idling engine speed NEid by restarting the fuel injection and the fuel ignition without causing the engine speed NE to decrease substantially below the idling engine speed NEid.

When the value of the fuel-cut flag Xfc is "0" upon the execution of the process of the step 1210 by the CPU, the CPU determines "No" at the step 1210 and then, proceeds with the process to a step 1220 to determine whether or not the value of the engine stop request flag Xstp is "1" and the value of the engine restart request flag Xrst is "0".

The value of the engine stop request flag Xstp is set to "1" when the aforementioned engine stop condition is satisfied. The value of the engine restart request flag Xrst is set to "1" when the brake pedal 92 is released and the acceleration pedal 91 is depressed, that is, the request of restarting the engine operation (the engine restart request) is generated after the execution of the engine stop control starts.

Now, it is assumed that the determination condition of the step 1220 is not satisfied. In this case, the CPU determines "No" at the step 1220 and then, proceeds with the process to a step 1230 to determine whether or not the value of the engine stop request flag Xstp is "1" and the value of the engine restart request flag Xrst is "1".

Now, it is assumed that the determination condition of the step 1230 is not satisfied. In this case, the CPU determines "No" at the step 1230 and then, proceeds with the process to a step 1240 to execute a normal control routine shown by a flowchart in FIG. 13.

Therefore, when the CPU proceeds with the process to the step 1240, the CPU starts a process from a step 1300 of FIG. 13 and then, sequentially executes processes of steps 1350 to 1335 described below. Then, the CPU proceeds with the process to the step 1295 of FIG. 12 via a step 1395.

Step 1305: The CPU acquires the present engine speed NEnow from the backup RAM and acquires the present acceleration pedal operation amount Accp on the basis of the output of the acceleration pedal operation amount sensor 77.

Step 1310: The CPU applies the actual engine speed NEnow and the acceleration pedal operation amount Accp as a representative value of the actual engine load to a lookup table MapQFtgt(NEnow,Accp) to acquire the target fuel injection amount QFtgt. According to the table MapQFtgt (NEnow,Accp), the acquired target fue injection amount QFtgt decreases as the present engine speed NEnow increases. Further, the acquired target fuel injection amount QFtgt increases as the acceleration pedal operation amount Accp increases.

Step 1315: The CPU applies the present engine speed NEnow and the acceleration pedal operation amount Accp to a lookup table MapTFtgt(NEnow,Accp) to acquire the target fuel injection timing TFtgt. According to the table MapTFtgt (NEnow,Accp), the acquired target fuel injection timing TFtgt advances as the present engine speed NEnow increases. Further, the acquired target fuel injection timing TFtgt advances as the acceleration pedal operation amount Accp increases.

Step 1320: The CPU applies the engine speed NEnow and the acceleration pedal operation amount Accp to a lookup table MapTItgt(NEnow,Accp) to acquire the target fuel ignition timing TItgt. According to the table MapTItgt (NEnow,Accp), the acquired target fuel ignition timing TItgt advances as the present engine speed NEnow increases. The acquired target fuel ignition timing TItgt delays as the acceleration pedal operation amount Accp increases.

Step 1325: The CPU applies the present engine speed NEnow and the acceleration pedal operation amount Accp to a lookup table MapTAtgt(NEnow,Accp) to acquire the target throttle valve opening degree TAtgt. According to the table MapTAtgt(NEnow,Accp), the acquired target throttle valve opening degree TAtgt increases as the present engine speed NEnow increases. Further, the acquired target throttle valve opening degree TAtgt increases as the acceleration pedal operation amount Accp increases.

Step 1330: The CPU sets the base fuel pressure PFb as the target fuel pressure PFtgt.

Step 1335: The CPU sends command signals to the fuel injector 39, the the ignition device 35, the throttle valve actuator 45*a* and the high pressure fuel pump 62 in accordance with the target fuel injection amount QFtgt, the target fuel injection timing TFtgt, the target fuel ignition timing TItgt, the target throttle valve opening degree TAtgt and the target fuel pressure PFtgt, respectively.

Thereby, the throttle valve opening degree TA is controlled to the target throttle valve opening degree TAtgt while the fuel pressure PF is controlled to the target fuel pressure PFtgt. In addition, the target fuel injection amount QFtgt of the fuel is injected from the fuel injector 39 at the target fuel injection timing TFtgt and thereafter, the fuel is ignited by the respective ignition device 35 at the target fuel ignition timing TItgt.

Figure 14:
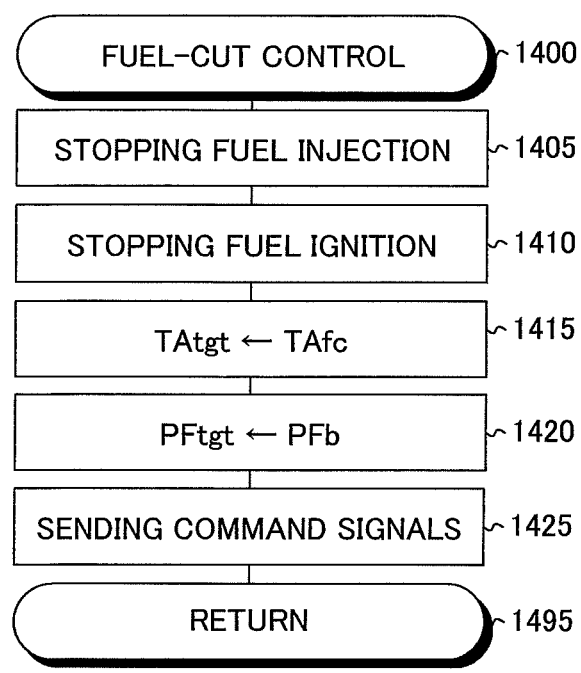
FIG. 14 shows a flowchart of a fuel-cut control routine executed by the CPU shown in FIG. 1.

Again, referring to FIG. 12, when the value of the fuel-cut flag Xfc is "1" upon the execution of the process of the step 1210 by the CPU, the CPU determines "Yes" at the step 1210 and then, proceeds with the process to a step 1215 to execute a fuel-cut control routine shown by a flowchart in FIG. 14.

Therefore, when the CPU proceeds with the process to the step 1215, the CPU starts a process from a step 1400 of FIG. 14 and then, sequentially executes processes of steps 1405 to 1425 described below. Then, the CPU proceeds with the process to the step 1295 of FIG. 12 via a step 1495.

Step 1405: The CPU stops the fuel injections. In this case, the CPU does not send command signals to the fuel injectors 39.

Step 1410: The CPU stops the fuel ignitions. In this case, the CPU does not send command signals to the ignition devices 35.

Step 1415: The CPU sets a fuel-cut opening degree TAfc as the target throttle valve opening degree TAtgt.

Step 1420: The CPU sets the base fuel pressure PFb to the target fuel pressure PFtgt.

Step 1425: The CPU sends command signals to the throttle valve actuator 45*a* and the high pressure fuel pump 62 in accordance with the target throttle valve opening degree TAtgt and the target fuel pressure PFtgt, respectively.

Thereby, the throttle valve opening degree TA is controlled to the fuel-cut opening degree TAfc and the fuel pressure PF is controlled to the target fuel pressure PFtgt. In this case, as described above, the fuel injections and the fuel ignitions are not carried out.

On the other hand, when the engine stop condition is satisfied and thus, the value of the engine stop request flag Xstp changes from "0" to "1", the CPU determines "No" at the step 1210 of FIG. 12 and determines "Yes" at the step 1220. Then, the CPU proceeds with the process to a step 1225 to execute an engine stop control routine shown by a flowchart in FIG. 15.

Therefore, when the CPU proceeds with the process to the step 1225, the CPU starts a process from a step 1500 and then, sequentially executes processes of steps 1510 to 1530. Then, the CPU proceeds with the process to the step 1295 of FIG. 12 via a step 1595.

Step 1510: The CPU stops the fuel injections. In this case, the CPU does not send command signals to the fuel injectors 39.

Step 1515: The CPU stops the fuel ignitions. In this case, the CPU does not send command signals to the ignition devices 35.

Step 1520: The CPU sets a value obtained by adding a predetermined value dTA to the fuel-cut opening degree TAfc as the target throttle valve opening degree TAtgt (TAtgt=TAfc+dTA). In this example, the fuel-cul opening degree TAfc corresponds to a throttle valve opening degree which is set as the target throttle valve opening degree TAtgt in the fuel-cut control shown in FIG. 14. In particular, the fuel-cut opening degree TAfc is zero or corresponds to the idling engine operation learned opening degree (for example, see JP 2013-142334 A). Further, the predetermined value dTA is set to a relatively large positive value. In this example, a value obtained by adding the predetermined value dTA to the fuel-cut opening degree TAfc corresponds to a throtite valve opening degree TAmax for fully opening the throttle valve 45.

Before the process of the step 1520 is first executed, at least the fuel-cut control is executed. Thus, the target throttle valve opening degree TAtgt is set to zero or the idling engine operation learned opening degree during the execution of the fuel-cut control. Therefore, in the step 1520, the target throttle valve opening degree TAtgt is set to a value larger than the target throttle valve opening degree TAtgt which has been set until the engine stop condition is satisfied.

Step 1525: The CPU sets a value obtained by adding a predetermined value dPF to the base fuel pressure PFb as the target fuel pressure PFtgt (PFtgt=PFb+dPF). In this example, the base fuel pressure PFb and the predetermined value dPF both are positive and larger than zero. Further, the base fuel pressure PFb is a fuel pressure which is set as the target fuel pressure PFtgt when the control other than the engine stop control is executed.

Therefore, before the process of the step 1525 is first executed, the target fuel pressure PF is set to the base fuel pressure PFb. Thus, in the step 1525, the target fuel pressure PFtgt is set to a value larger than the target fuel pressure PFtgt which has been set until the engine stop condition is satisfied.

Step 1530: The CPU sends command signals to the throttle valve actuator 45*a* and the high pressure fuel pump 62 in accordance with the target throttle valve opening degree TAtgt and the target fuel pressure PFtgt, respectively.

Thereby, the throttle valve opening degree TA and the fuel pressure PF are controlled to the target throttle valve opening degree TAtgt and the target fuel pressure PFtgt, respectively. In other words, the throttle valve opening degree TA and the fuel pressure PF are increased to the throttle valve opening degree and the fuel pressure larger than the throttle valve opening degree and the fuel pressure which have been set until the engine stop condition is satisfied, respectively. On the other hand, since the fuel injection and the fuel ignition are not carried out, the engine speed NE gradually decreases. Then, as far as the engine restart request is not generated, the engine speed NE becomes zero and the engine operation stops.

When the brake pedal 92 is released and the acceleration pedal 91 is depressed after the engine stop control is started to be executed, the engine restart request is generated and then, the value of the engine restart request flag Xrst is changed to "1". In this case, the CPU determines "No" at the steps 1210 and 1220 of FIG. 12 and determines "Yes" at the step 1230. Then, the CPU proceeds with the process to a step 1235 to execute the above-described engine start control routine shown in FIG. 7.

The entire engine operation control executed by the present control device has been described.

Modified Example 1

Figure 16A:
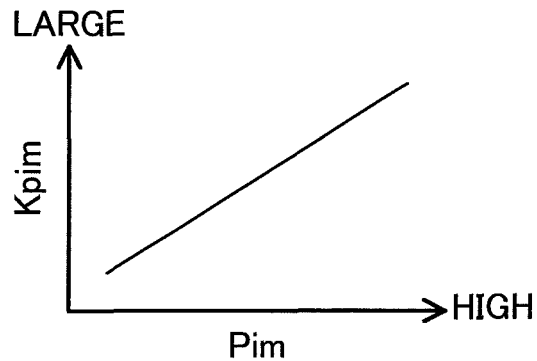
FIG. 16(A) shows a relationship between an intake air pressure and an intake air pressure correction coefficient.

In the engine start control according to the embodiment, the standby time TNEth may decrease as the intake air pressure Pim decreases. In particular, a correction coefficient Kpim for correcting the standby time TNEth depending on the intake air pressure Pim is previously acquired by an experiment and is stored in the ROM of the ECU 80 as a lookup table MapKpim(Pim) which is a function of the intake air pressure Pim (hereinafter, the correction coefficient Kpim will be referred to as "the intake pressure correction coefficient Kpim"). According to the table MapKpim(Pim), as shown in FIG. 16(A), the acquired intake pressure correction coefficient Kpim is a positive value larger than zero and increases as the intake air pressure Pim increases.

The control device according to this modified example (hereinafter, will be referred to as "the modified control device") applies the intake air pressure Pim to the table MapKpim(Pim) to acquire the intake pressure correction coefficient Kpim when the modified control device has determined that the TDC stop occurs upon the generation of the engine restart request. Further, the modified control device multiplies the standby time TNEth by the acquired intake pressure correction coefficient Kpim to correct the standby time TNEth. In this case, the corrected standby time TNEth_hs increases as the intake air pressure Pim increases.

The modified control device starts the engine operation by executing the ignition engine start control when the crank angle sensor signal is output before the elapsed time TNE reaches the corrected standby time TNEth_hs. On the other words, the modified control device starts the engine operation by executing the starter engine start control when the crank angle sensor signal is not output before the elapsed time TNE reaches the corrected standby time TNEth_hs.

The reasons that the modified control device increases the standby time TNEth as the intake air pressure Pim increases, will be described. Under the condition that the intake air pressure Pim is high, the pressure in the combustion 25 (i.e., the in-cylinder pressure) is high when the piston 22 locates at or around the compression TDC. Therefore, under the condition that the in-cylinder is high when the piston 22 of the TDC stop cylinder stops at a crank angle immediately before the compression TDC upon the time of making the TDC stop determination, the piston 22 is likely to start moving in the inverse direction, that is, the crank shaft 24 is likely to start rotating in the inverse direction after the TDC stop determination is made. Thus, after the TDC stop determination is made, the crank angle sensor signal is likely to be output within a relatively short time.

Further, when the piston 22 of the TDC stop cylinder moves extremely slowly toward the compression TDC immediately before the compression TDC upon the time of making the TDC stop determination and the in-cylinder pressure is high, even if the piston 22 stops without moving beyond the compression TDC, the piston 22 is likely to start moving eventually in the inverse direction within a relatively short time. Thus, the crank angle sensor signal is likely to be output within a relatively short time after the TDC stop determination is made. On the other hand, if the piston 22 moves beyond the compression TDC, the piston 22 eventually moves fast, that is, the crank shaft 24 rotates in the normal direction at a high speed (i.e., the engine 10 operates in a normal manner at a high engine speed). Thus, the crank angle sensor signal is likely to be output within a relatively short time after the TDC stop determination is made.

Further, under the condition that the piston 22 of the TDC stop cylinder moves extremely slowly immediately after the compression TDC upon the time of making the TDC stop determination and the in-cylinder pressure is high, the piston 22 moves fast after the TDC stop determination is made. Thus, the crank angle sensor signal is likely to be output within a relatively short time after the TDC stop determination is made.

Under the condition that the intake air pressure Pim is high, the crank angle sensor signal is likely to be output within a relatively short time after the TDC stop determination is made. Therefore, even when the standby time TNEth is increased under the condition that the intake air pressure Pim is high, the crank angle sensor signal is output within a relatively short time after the TDC stop determination is made and the engine operation is started by the execution of the ignition engine start control. Thus, the opportunity of starting the engine operation by executing the ignition engine start control can be increased without excessively delaying the timing of starting the engine operation by executing the starter engine start control.

On the other hand, under the condition that the intake air pressure Pim is low when the piston 22 locates at or around the compression TDC, the in-cylinder pressure is low. Therefore, under the condition that the in-cylinder pressure is low when the piston 22 of the TDC stop cylinder stops immediately before the compression TDC upon the time of making the TDC stop determination, the piston 22 is unlikely to move in the inverse direction. Thus, the crank angle sensor signal is unlikely to be output after the TDC stop determination is made.

Further, under the condition that the in-cylinder pressure is low when the piston 22 of the TDC stop cylinder moves extremely slowly toward the compression TDC immediately before the compression TDC upon the time of making the TDC stop determination, the piston 22 is unlikely to move beyond the compression TDC and is likely to stop immediately before the compression TDC. Thus, the crank angle sensor signal is unlikely to be output after the TDC stop determination is made.

Furthermore, under the condition that the in-cylinder pressure is low when the piston 22 of the TDC stop cylinder moves extremely slowly immediately after the compression TDC upon the time of making the TDC stop determination, the piston 22 is likely to stop immediately after the compression TDC before the crank angle sensor signal is output. Thus, the crank angle sensor signal is unlikely to be output after the TDC stop determination.

As described above, under the condition that the intake air pressure Pim is low, the crank angle sensor signal is unlikely to be output after the TDC stop determination is made. Therefore, even if the standby time TNEth is decreased when the intake air pressure Pim is low, the crank angle sensor signal is unlikely to be output after the standby time TNEth elapses. Thus, even if the engine operation is started by the execution of the starter engine start control under the condition that the crank angle sensor signal is not output before the standby time TNEth elapses, the opportunity of starting the engine operation by executing the ignition engine start control can be ensured. In addition, it is possible to start the engine operation by executing the starter engine start control at an early timing.

That is the reason that the standby time TNEth is increased as the intake air pressure Pim increases, in other words, the standby time TNEth is decreased as the intake air pressure Pim decreases.

Modified Example 2

Figure 16B:
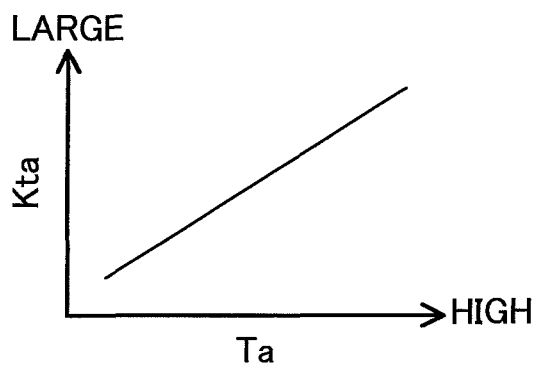
FIG. 16(B) shows a relationship between an intake air temperature and an intake air temperature correction coefficient.

Further, in the engine start control according to the embodiment, the standby time TNEth may be increased as the intake air temperature Ta increases. In particular, a correction coefficient Kta for correcting the standby time TNEth depending on the intake air temperature Ta is previously acquired by an experiment and is stored in the ROM of the ECU 80 as a lookup table MapKta(Ta) which is a function of the intake air temperature Ta (hereinafter, the correction coefficient Kta will be referred to as "the intake air temperature correction coefficient Kta"). According to the table MapKta(Ta), as shown in FIG. 16(B), the acquired intake air temperature correction coefficient Kta is a positive value larger than zero and increases as the intake air temperature Ta increases.

The control device according to this modified example (hereinafter, will be referred to as "the modified control device") applies the intake air temperature Ta to the table MapKta(Ta) to acquire the intake air temperature correction coefficient Kta when the modified control device has determined that the TDC stop occurs upon the generation of the engine restart request. Further, the modified control device multiplies the standby time TNEth by the acquired intake air temperature correction coefficient Kta to correct the standby time TNEth. In this case, the corrected standby time TNEth_hs increases as the intake air temperature Ta increases.

The modified control device starts the engine operation by executing the ignition engine start control when the crank angle sensor signal is output before the elapsed time TNE reaches the corrected standby time TNEth_hs. On the other hand, the modified control device starts the engine operation by executing the starter engine start control when the crank angle sensor signal is not output before the elapsed time TNE reaches the corrected standby time TNEth_hs.

The reasons that the modified control device increases the standby time TNEth as the intake air temperature Ta increases, will be described. When the intake air temperature Ta is high, the in-cylinder pressure is high when the piston 22 locates at or around the compression TDC. Therefore, as described above, even when the standby time TNEth is increased under the condition that the intake air temperature Ta is high, the crank angle sensor signal is output within a relatively short time after the TDC stop determination is made and then, the engine operation is started by the execution of the ignition engine start control. Thus, the opportunity of starting the engine operation by executing the ignition engine start control can be increased without excessively delaying the timing of starting the engine operation by executing the starter engine start control.

On the other hand, under the condition that the intake air temperature Ta is low when the piston 22 locates at or around the compression TDC, the in-cylinder pressure is low. Therefore, as described above, even if the standby time TNEth is decreased when the intake air temperature Ta is low, the crank angle sensor signal is unlikely to be output after the standby time TNEth elapses. Thus, even if the engine operation is started by the execution of the starter engine start control under the condition that the crank angle sensor signal is not output before the standby time TNEth elapses, the opportunity of starting the engine operation by executing the ignition engine start control can be ensured. In addition, it is possible to start the engine operation by executing the starter engine start control at an early timing.

That is the reason that the standby time TNEth is increased as the intake air temperature Ta increases, in other words, the standby time TNEth is decreased as the intake air temperature Ta decreases.

Modified Example 3

Figure 16C:
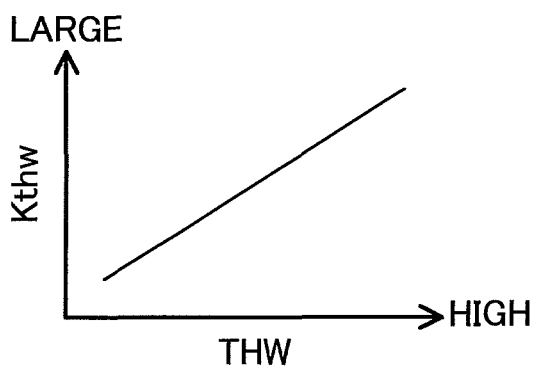
FIG. 16(C) shows a relationship between a cooling water temperature and a cooling water temperature correction coefficient.

Furthermore, in the engine start control according to the embodiment, the standby time TNEth may be increased as the cooling water temperature THW is high. In particular, a correction coefficient Kthw for correcting the standby time TNEth depending on the cooling water temperature THW is previously acquired by an experiment and is stored in the ROM of the ECU 80 as a lookup table MapKthw(thw) which is a function of the cooling water temperature THW (hereinafter, the correction coefficient Kthw will be referred to as "the cooling water temperature correction coefficient Kthw"). According to the table MapKthw(thw), as shown in FIG. 16(C), the acquired cooling water temperature correction coefficient Kthw is a positive value larger than zero and increases as the cooling water temperature THW increases.

The control device according to this modified example (hereinafter, will be referred to as "the modified control device") applies the cooling water temperature THW to the table MapKthw(thw) to acquire the cooling water temperature correction coefficient Kthw when the modified control device has determined that the TDC stop occurs. Further, the modified control device multiplies the standby time TNEth by the acquired cooling water temperature correction coefficient Kthw to correct the standby time TNEth. In this case, the corrected standby time TNEth_hs increases as the cooling water temperature THW increases.

The modified control device starts the engine operation by executing the ignition engine start control when the crank angle sensor signal is output before the elapsed time TNE reaches the corrected standby time TNEth_hs. On the other hand, the modified control device starts the engine operation by executing the starter engine start control when the crank angle sensor signal is not output before the elapsed time TNE reaches the corrected standby time TNEth_hs.

The reasons that the modified control device increases the standby time TNEth as the cooling water temperature THW increases, will be described. When the cooling water temperature THW is high, a viscosity of a lubrication oil for lubricating the engine 10 is low. Therefore, under the condition that the viscosity of the lubrication oil is low when the piston 22 of the TDC stop cylinder stops immediately before the compression TDC upon the time of making the TDC stop determination, the piston 22 is likely to move. Therefore, the piston 22 is likely to start moving in the inverse direction within a relatively short time after the TDC stop determination is made. Thus, the crank angle sensor signal is likely to be output within a relatively short time after the TDC stop determination is made.

Further, under the condition that the viscosity of the lubrication oil is low when the piston 22 of the TDC stop cylinder moves extremely slowly toward the compression TDC immediately before the compression TDC, the piston 22 is likely to move beyond the compression TDC. In addition, after the piston 22 moves beyond the compression TDC, the piston 22 moves fast. Thus, the crank angle sensor signal is likely to be output within a relatively short time after the TDC stop determination is made. Even if the piston 22 stops without moving beyond the compression TDC, the viscosity of the lubrication oil is low and thus, the piston 22 is likely to move. Therefore, the piston 22 is likely to start moving in the inverse direction within a relatively short time after the piston 22 stops. Thus, the crank angle sensor signal is likely to be output within a relatively short time after the TDC stop determination is made.

Furthermore, under the condition that the viscosity of the lubrication oil when the piston 22 of the TDC stop cylinder moves extremely slowly immediately after the compression TDC upon the time of making the TDC stop determination, the piston 22 eventually starts moving fast. Thus, the crank angle sensor signal is likely to be output within a relatively short time after the TDC stop determination is made.

As described above, the crank angle sensor signal is likely to be output within a relatively short time after the TDC stop determination is made when the cooling water temperature THW is high. Therefore, even if the standby time TNEth is increased when the cooling water temperature THW is high, the crank angle sensor signal is output within a relatively short time after the TDC stop determination is made and thus, the engine operation is started by the execution of the ignition engine start control. Thus, the opportunity of starting the engine operation by executing the ignition engine start control can be increased without excessively delaying the timing of starting the engine operation by executing the starter engine start control.

On the other hand, when the cooling water temperature THW is low, the viscosity of the lubrication oil is high. Therefore, under the condition that the viscosity of the lubrication oil is high when the piston 22 of the TDC stop cylinder stops immediately before the compression TDC upon the time of making the TDC stop determination, the piston 22 is unlikely to move. Therefore, the piston 22 is unlikely to move in the inverse direction after the TDC stop determination is made. Thus, the crank angle sensor signal is unlikely to be output after the TDC stop determination is made.

Under the condition that the viscosity of the lubrication oil is high when the piston 22 of the TDC stop cylinder moves extremely slowly toward the compression TDC immediately before the compression TDC upon the time of making the TDC stop determination, the piston 22 is likely to stop immediately before the compression TDC without moving beyond the compression TDC. Thus, the crank angle sensor signal is likely to be output after the TDC stop determination is made.

Further, under the condition that the viscosity of the lubrication oil is high when the piston 22 of the TDC stop cylinder moves extremely slowly immediately after the compression TDC upon the time of making the TDC stop determination, the piston 22 is likely to stop immediately after the compression TDC before the crank angle sensor signal is output. Thus, the crank angle sensor signal is unlikely to be output after the TDC stop determination is made.

As described above, when the cooling water temperature THW is low, the crank angle sensor signal is unlikely to be output after the TDC stop determination is made. Therefore, even if the standby time TNEth is decreased when the cooling water temperature THW is low, the crank angle sensor signal is unlikely to be output after the standby time TNEth elapses. Thus, even when the engine operation is started by the execution of the starter engine start control under the condition that the crank angle sensor signal is not output before the standby time TNEth elapses, the opportunity of starting the engine operation by the ignition engine start control can be ensured. In addition, the execution of the starter engine start control can be started at an early timing.

That is the reason that the standby time TNEth is increased as the cooling water temperature THW increases, in other words, the standby time TNEth is decreased as the cooling water temperature THW decreases.

It should be noted that the present invention is not limited to the embodiment and various modifications can be employed within the scope of the invention. For example, in the embodiment, the engine speed NE acquired on the basis of the last signal is used as the last engine speed NEcz for acquiring the standby time TNEth. However, as the last engine speed, the engine speed NE acquired on the basis of a signal output from the crank angle sensor 74 by a predetermined number before the last signal is output, that is, on the basis of a signal output from the crank angle sensor 74 immediately before the last signal is output from the crank angle sensor 74, may be used.

Further, in the embodiment, a value acquired by adding a predetermined determination time TSGth to the standby time TNEth may be used as the standby time TNEth. In this case, a time elapsing from the output of the last signal from the crank angle sensor 74 is used as the elapsed time TNE.

Further, in the embodiment, the intake air pressure Pim and the throttle valve opening degree TA which have correlation with the in-cylinder pressure are used as parameters for determining the correction coefficient for correcting the standby time TNEth. However, the present invention is not limited to the intake air pressure Pim and the intake air temperature Ta. The other index value other than the intake air pressure Pim and the throttle valve opening degree TA may be used if the index value has a correlation with the in-cylinder pressure.

Further, in the embodiment, the cooling water temperature THW, which has correlation with the viscosity of the lubrication oil, is used as a parameter for determining the correction coefficient for correcting the standby time TNEth. However, the present invention is not limited to the cooling water temperature THW. The control device according to the present invention may use an index value other than the cooling water temperature THW if the index value has correlation with the viscosity of the lubrication oil.

Further, in the engine stop control according to the embodiment, in place of stopping the fuel ignitions at the same time as the satisfaction of the engine stop condition, the fuel ignitions may be continued to be carried out for burning the unburned fuel remaining in the combustion chambers 25 and at the time when a constant time elapses after the satisfaction of the engine stop condition, the fuel ignitions may be stopped.

What is claimed is:

1. A control device of a multi-cylinder internal combustion engine comprising:
   cylinder bores;
   pistons housed in the respective cylinder bores, the respective pistons and the respective cylinder bores forming combustion chambers;
   fuel injectors for injecting fuel directly into the respective combustion chambers;
   ignition devices each including a spark plug;
   a crank angle sensor for outputting a signal every predetermined crank angle;
   a crank shaft connected to the pistons; and
   a starter motor for rotating the crank shaft;
   the control device comprising a control section programmed to control operations of the fuel injectors, the ignition devices and the starter motor and acquire a speed of the engine as an engine speed on the basis of the signal output from the crank angle sensor,
   wherein the control section is programmed:
   to start executing an engine stop control for causing the fuel injectors to stop injecting fuel to stop an operation of the engine when a predetermined engine stop condition is satisfied;
   to start executing an ignition engine start control for causing the fuel injector to inject fuel into the combustion chamber, a stroke of which corresponding to the combustion stroke, and causing the ignition device to ignite the fuel to restart the operation of the engine without the starter motor,
   when (a) a predetermined engine restart request is generated after the execution of the engine stop control is started, (b) a last signal, which is lastly output from the crank angle sensor before the predetermined engine restart request is generated, corresponds to a signal corresponding to the compression top dead center (TDC) of any of the combustion chambers and (c) a signal is output from the crank angle sensor before a time elapsing from the output of the last signal from the crank angle sensor reaches a predetermined time;
   to start executing a starter engine start control for causing the fuel injectors to inject fuel and causing the ignition devices to ignite the fuel with the starter motor to restart the operation of the engine when (a) a predetermined engine restart request is generated after the execution of the engine stop control is started, (b) a last signal, which is lastly output from the crank angle sensor before the predetermined engine restart request is generated, corresponds to a signal corresponding to the compression top dead center (TDC) of any of the combustion chambers and (c) and no signal is output from the crank angle sensor before a time elapsing from the output of the last signal from the crank angle sensor reaches a predetermined time; and
   to set the predetermined time on the basis of a last engine speed acquired on the basis of the last signal and a signal output from the crank angle sensor immediately before the last signal is output from the crank angle sensor such that the predetermined time set when the last engine speed corresponds to a first engine speed, is longer than the predetermined time set when the last engine speed corresponds to a second engine speed larger than the first engine speed.

2. The control device of the internal combustion engine according to claim 1, wherein the control section is programmed:
   to acquire an in-cylinder pressure correlation value when the last signal corresponds to the combustion TDC of a particular combustion chamber among the combustion chambers, the in-cylinder pressure correlation value correlating with an in-cylinder pressure of the particular combustion chamber and a first in-cylinder pressure correlation value corresponding to the in-cylinder pressure correlation value acquired when the in cylinder pressure corresponds to a first in-cylinder pressure, is smaller than a second in-cylinder pressure correlation value corresponding to the in-cylinder pressure correlation value acquired when the in-cylinder pressure corresponds to a second in-cylinder pressure higher than the first in-cylinder pressure; and to correct the predetermined time on the basis of the in-cylinder pressure correlation value such that the predetermined time set when the in-cylinder pressure correlation value corresponds to the first in-cylinder pressure correlation value, is smaller than the predetermined time set when the in-cylinder pressure correlation value corresponds to the second in-cylinder pressure correlation value.

3. The control device of the internal combustion engine according to claim 2, wherein the in-cylinder pressure correlation value changes depending on at least one of a pressure and a temperature of air suctioned into the combustion chambers, the in-cylinder pressure correlation value set when the pressure of the air corresponds to a first pressure, is smaller than the in-cylinder pressure correlation value set when the pressure of the air corresponds to a second pressure higher than the first pressure, and the in-cylinder pressure correlation value set when the temperature of the air corresponds to a first air temperature, is smaller than the in-cylinder pressure correlation value set when the temperature of the air corresponds to a second air temperature higher than the first air temperature.

4. The control device of the internal combustion engine according to claim 1, wherein the control section is programmed:

to acquire a viscosity correlation value correlating with a viscosity of lubrication oil for lubricating the engine when the last signal corresponds to a signal corresponding to the combustion TDC of a particular combustion chamber among the combustion chambers, a first viscosity correlation value corresponding to the viscosity correlation value acquired when the viscosity corresponds to a first viscosity, is smaller than a second viscosity correlation value corresponding to the viscosity correlation value acquired when the viscosity corresponds to a second viscosity higher than the first viscosity; and to correct the predetermined time on the basis of the viscosity correlation value such that the predetermined time set when the viscosity correlation value corresponds to the first viscosity correlation value, is longer than the predetermined time set when the viscosity correlation value corresponds to the second viscosity correlation value.

5. The control device of the internal combustion engine according to claim 4, wherein the viscosity correlation value changes depending on a temperature of a cooling water for cooling the engine and the viscosity correlation value acquired when the temperature of the cooling water corresponds to a first cooling water temperature, is larger than the viscosity correlation value acquired when the temperature of the cooling water corresponds to a second cooling water temperature higher than the first cooling water temperature.

* * * * *